(12) United States Patent
Hashimshony

(10) Patent No.: US 9,468,163 B2
(45) Date of Patent: Oct. 18, 2016

(54) SMART PIPE SYSTEM

(71) Applicant: R. Hashimshony Engineering Ltd., Pardes Hanna (IL)

(72) Inventor: Rami Hashimshony, Moshav Aviel (IL)

(73) Assignee: R. Hashimshony Engineering Ltd., Pardes Hanna (IL)

( * ) Notice: Subject to any disclaimer, the term of this patent is extended or adjusted under 35 U.S.C. 154(b) by 0 days.

(21) Appl. No.: 14/413,243

(22) PCT Filed: Jul. 9, 2013

(86) PCT No.: PCT/US2013/049643
§ 371 (c)(1),
(2) Date: Jan. 7, 2015

(87) PCT Pub. No.: WO2014/011583
PCT Pub. Date: Jan. 16, 2014

(65) Prior Publication Data
US 2015/0201569 A1    Jul. 23, 2015

Related U.S. Application Data

(60) Provisional application No. 61/671,114, filed on Jul. 13, 2012, provisional application No. 61/787,322, filed on Mar. 15, 2013.

(51) Int. Cl.
| | | |
|---|---|---|
| *F16L 53/00* | (2006.01) | |
| *A01G 25/16* | (2006.01) | |
| *A01G 25/06* | (2006.01) | |
| *F16L 25/00* | (2006.01) | |
| *F16L 55/00* | (2006.01) | |

(52) U.S. Cl.
CPC ............ *A01G 25/16* (2013.01); *A01G 25/06* (2013.01); *F16L 25/00* (2013.01); *F16L 55/00* (2013.01); *Y10T 29/49947* (2015.01)

(58) Field of Classification Search
CPC ....... A01G 25/16; A01G 25/06; F16L 25/00; F16L 55/00; F02B 6/4459; F02B 6/50; H01B 7/0072; H01B 7/306
See application file for complete search history.

(56) References Cited

U.S. PATENT DOCUMENTS

| | | | |
|---|---|---|---|
| 5,097,861 A | | 3/1992 | Hopkins |
| 5,182,440 A | * | 1/1993 | Dufour ................. B29C 65/344 156/274.2 |

(Continued)

FOREIGN PATENT DOCUMENTS

| | | |
|---|---|---|
| EP | 1103178 | 5/2001 |
| GB | 2217425 | 10/1989 |

OTHER PUBLICATIONS

PCT Written Opinion and Search PCT/US2013/049643, Oct. 17, 2013.

*Primary Examiner* — Brian Mattei
(74) *Attorney, Agent, or Firm* — Dekel Patent Ltd.; David Klein

(57) ABSTRACT

A system includes pipes, each of which has a pipe passageway for fluid to pass therethrough and electrical conductors insulated from the pipe passageway. At least one fluid connector has a connector passageway for fluid to pass therethrough and electrical conductors insulated from the connector passageway. The pipes are fluidly and electrically connected to the at least one fluid connector. An irrigation controller and a power source are electrically connected to the pipes.

13 Claims, 24 Drawing Sheets

(56) References Cited

U.S. PATENT DOCUMENTS

| | | |
|---|---|---|
| 7,069,115 B1 | 6/2006 | Woytowitz |
| 8,293,044 B1 * | 10/2012 | Riddell ................ A01M 29/26 156/71 |
| 2005/0285706 A1 * | 12/2005 | Hall ...................... E21B 17/028 336/132 |
| 2008/0254677 A1 * | 10/2008 | Amidon ............. H01R 13/6592 439/583 |
| 2015/0072254 A1 * | 3/2015 | Suzuki ...................... C25B 1/04 429/422 |

* cited by examiner

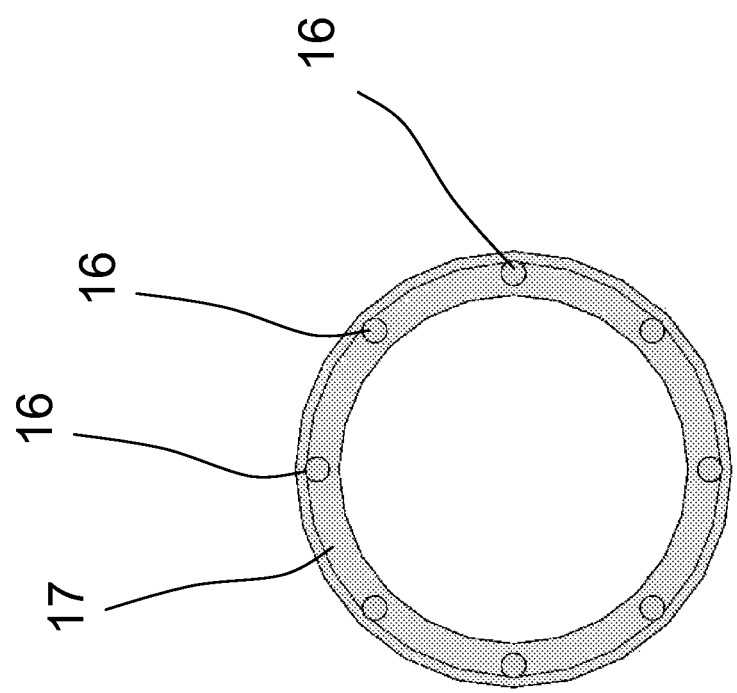
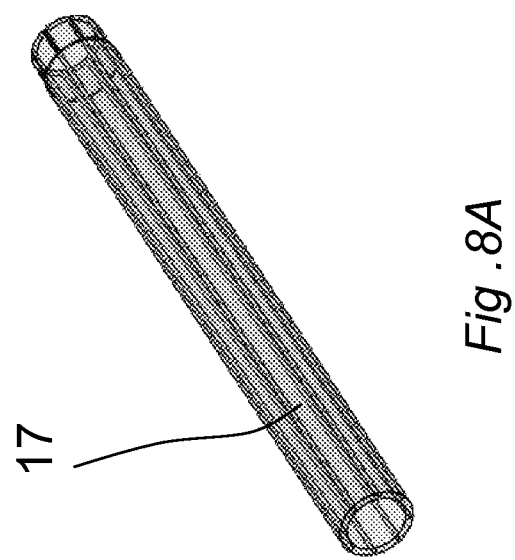
Fig. 8B
Fig. 8A

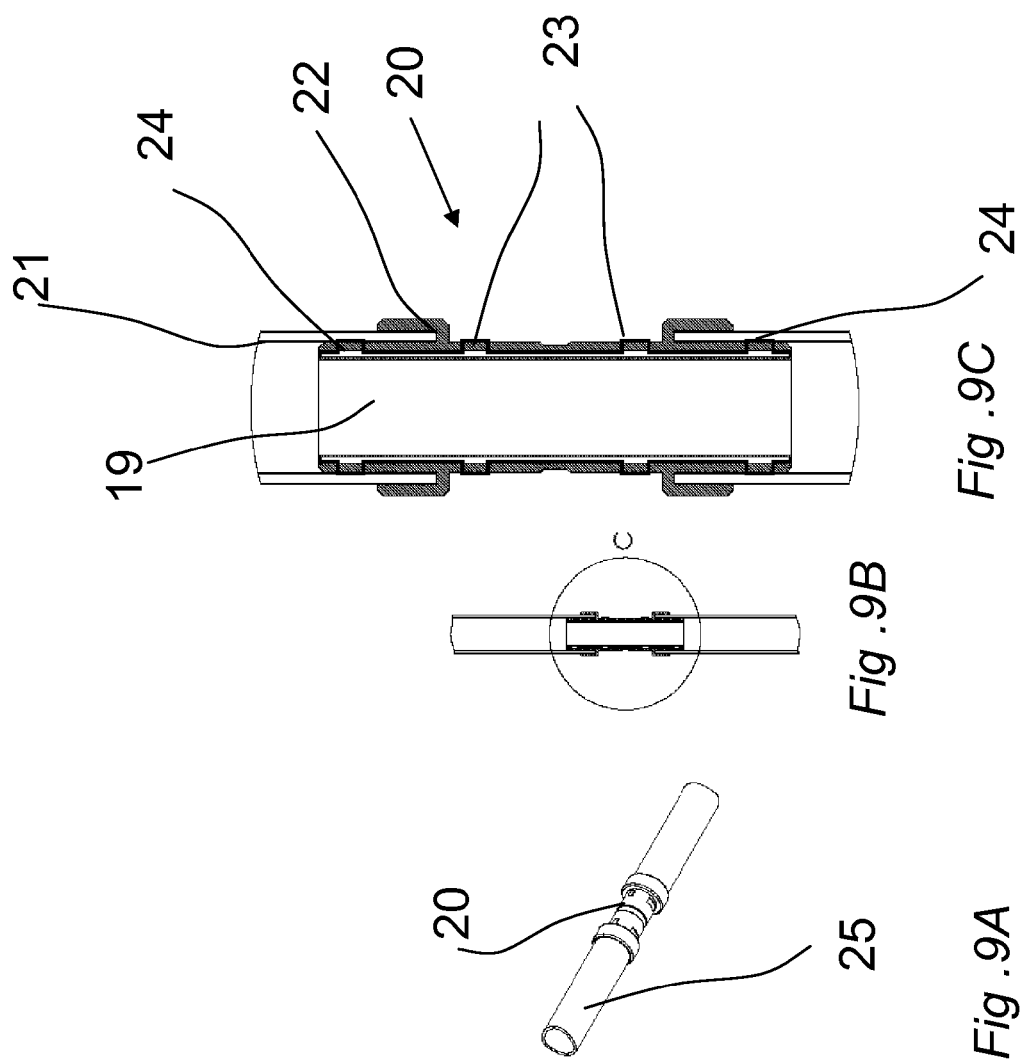

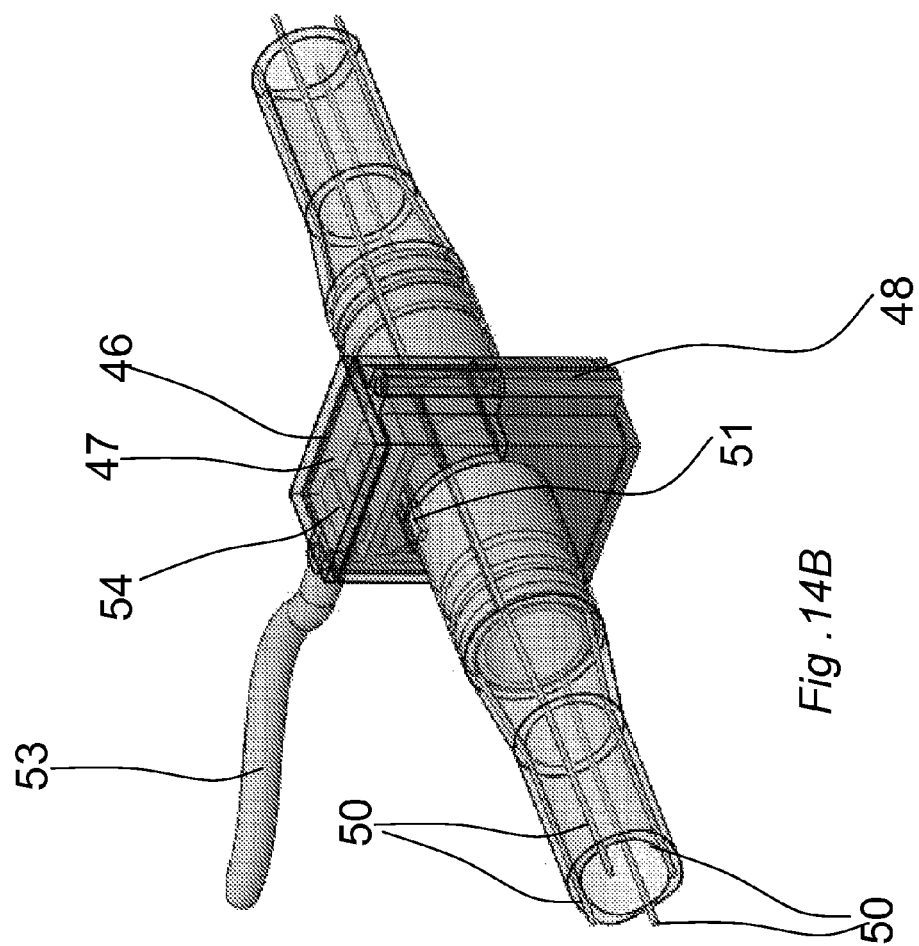
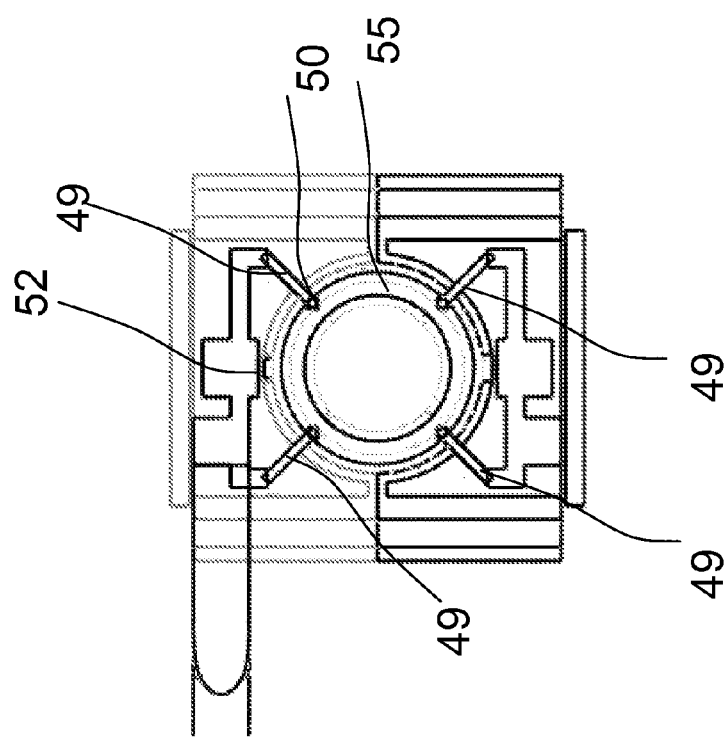
Fig. 14A
Fig. 14B

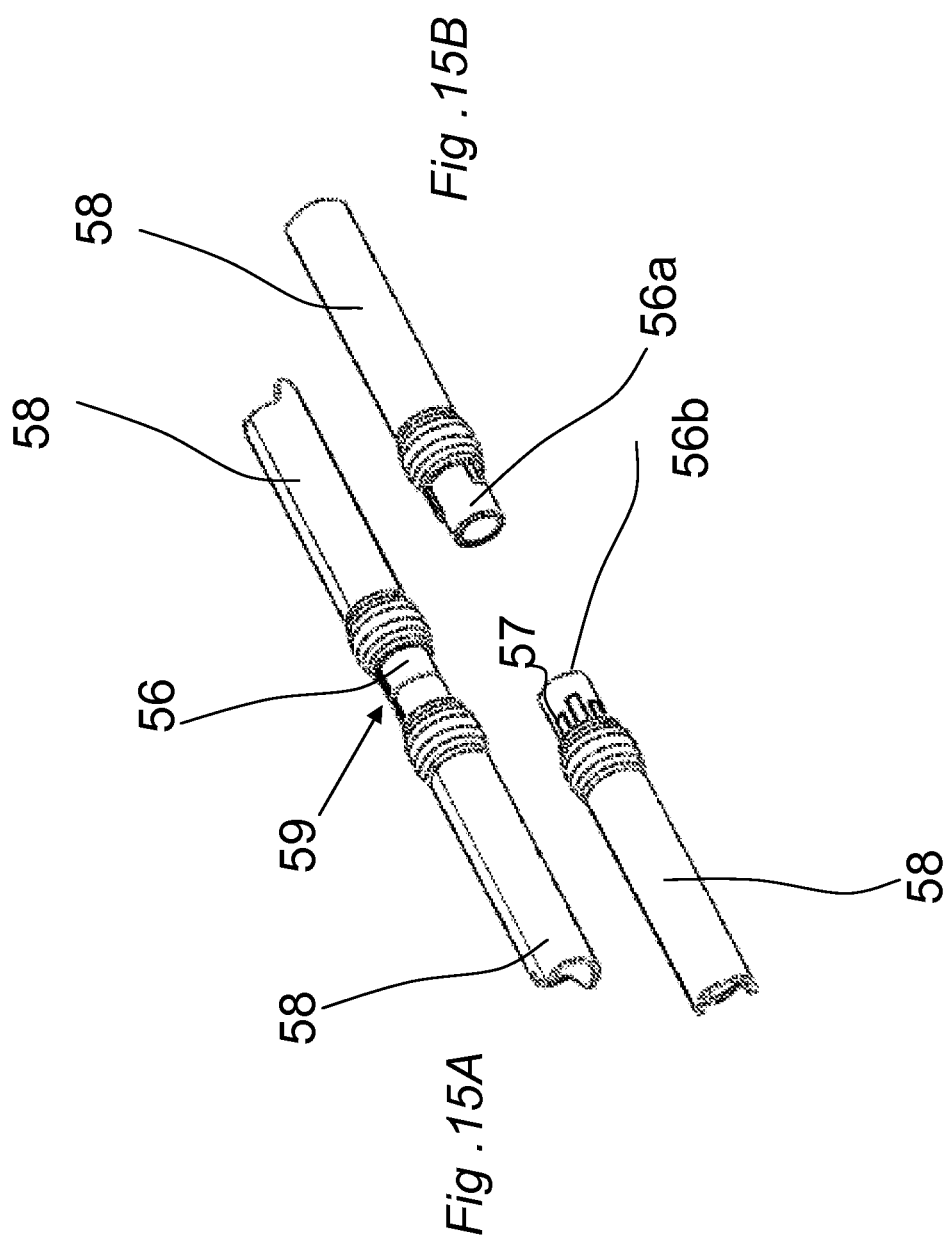

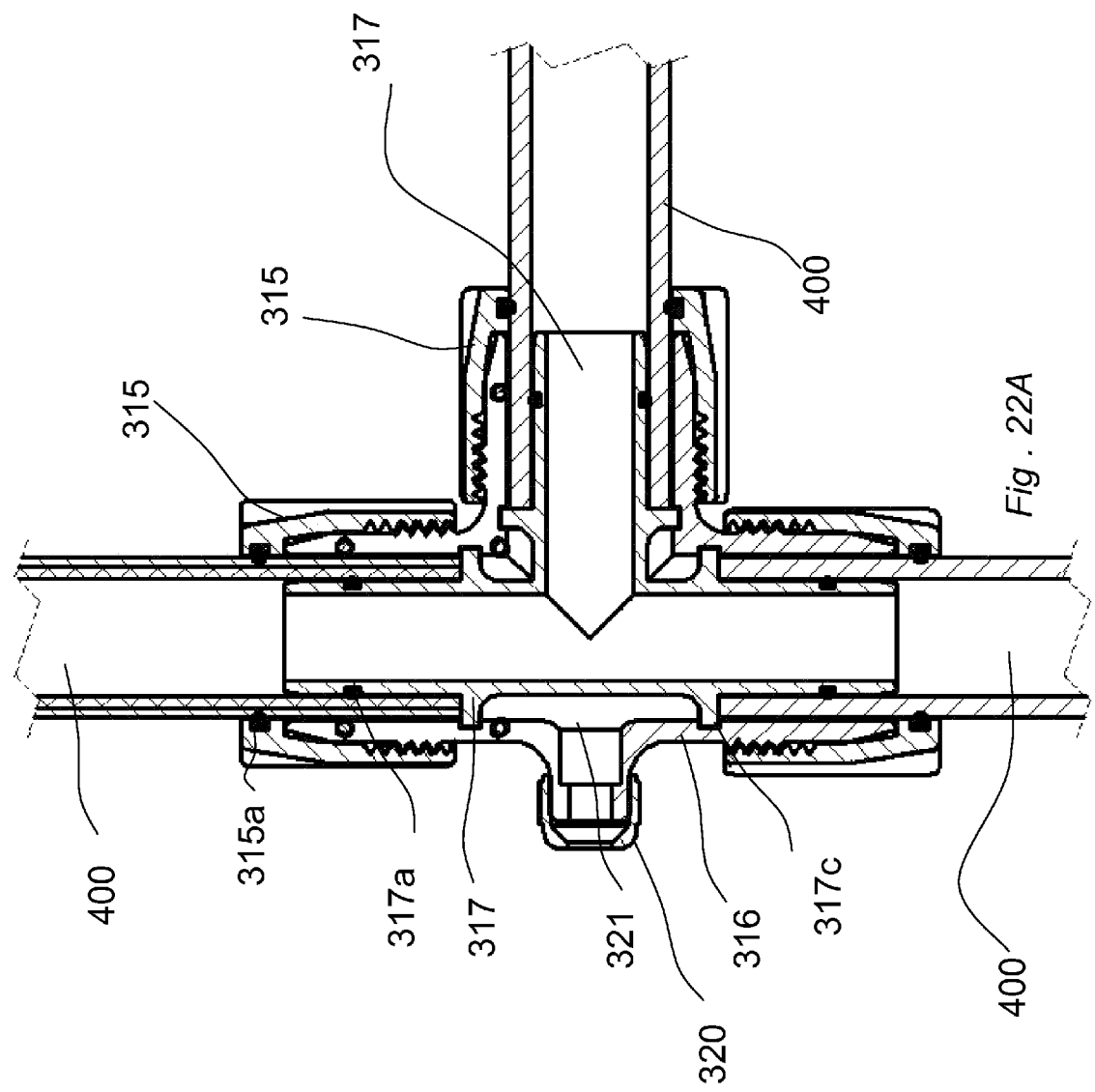

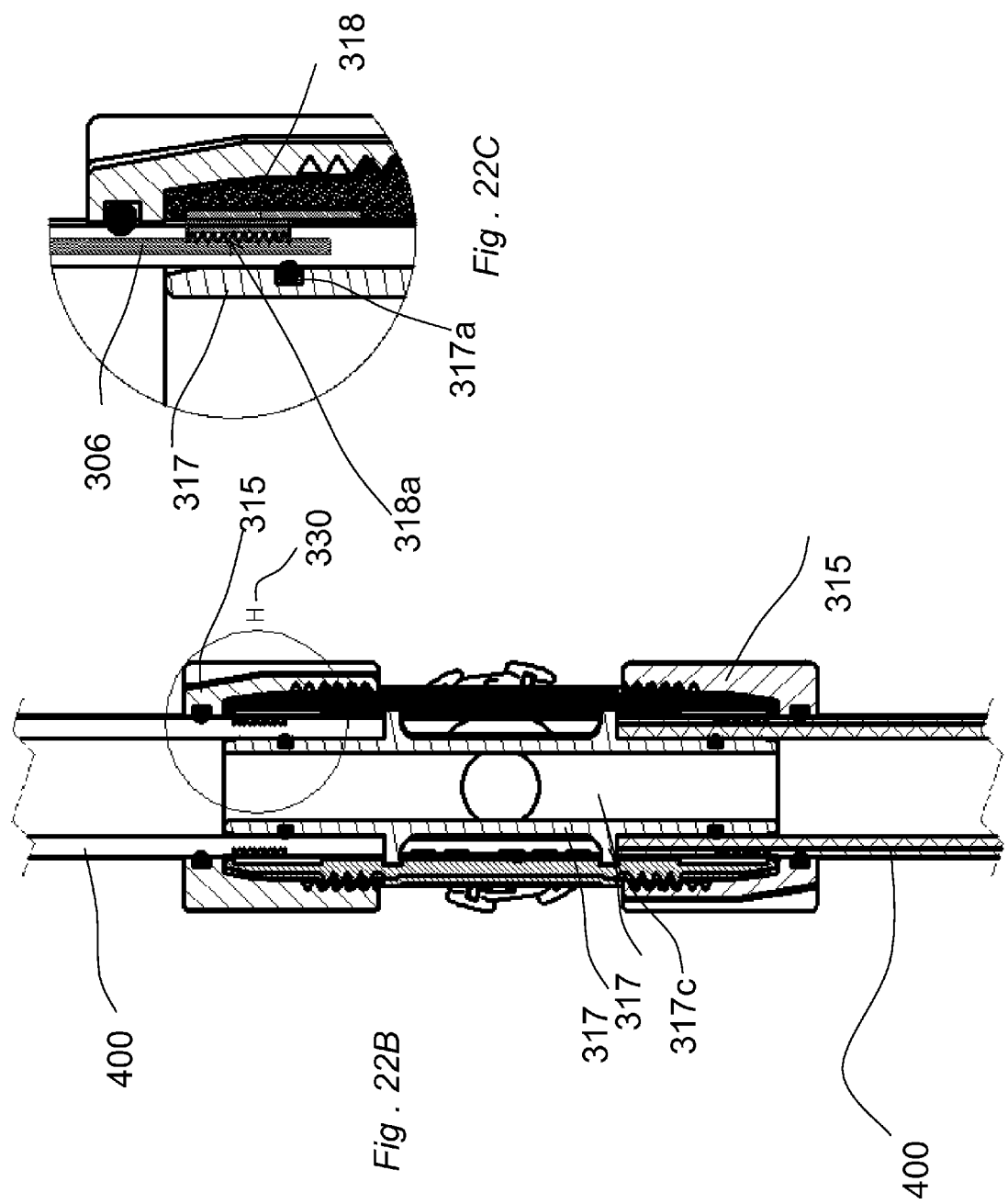

SMART PIPE SYSTEM

CROSS REFERENCE TO OTHER APPLICATIONS

This application is a US national phase application of PCT patent application PCT/US2013/049643, filed Jul. 9, 2013, which claims priority from US Provisional Patent Application 61/671,114, filed Jul. 13, 2012, and from U.S. Provisional Patent Application 61/787,322, filed Mar. 15, 2013.

FIELD OF THE INVENTION

The present invention is related generally to pipe systems, and particularly to a system with pipes and connectors for fluid flow and which have built-in, insulated electrical and transmission lines, such as for irrigation systems.

BACKGROUND

In some pipe systems there is a need to control an electrical powered device installed on or near the pipe system. Often the installed device is controlled or powered by external wires exposed to the environment. Such wiring has a high risk for potential failure and often has high installation and maintenance costs.

An example of such a pipe system is a watering or irrigation system that includes electro-mechanical valves controlled by a central controller. The control typically includes timers for irrigation. The timing can be based on real time information feeds by sensors and/or Internet connection to weather broadcasts.

Each electric water valve or sensor or other electrical device requires one or more hotwires connecting it directly to the central controller and a common wire coupled to all devices and the central controller. If the devices are distributed further from the central controller, more extensive wiring is required and a greater number of junction boxes are required along the pipes.

In many of today's garden lighting systems, the central controller, in addition to basic ON and OFF functions, also enables creative lighting effects (e.g. changes in color and/or intensity). This, of course, entails installation of additional cables and infrastructure joining the central controller to the array of lighting fixtures.

A critical component in ensuring the reliability of these watering systems is maintaining the quality of the electrical conduction between the central controllers and the device they control. However, electrical transmission lines in the fields are exposed to sunlight, moisture and variable environmental conditions, as well as deliberate or accidental vandalism by people or animals. After a short time, many systems are disabled, either fully or partially, due to failure of cables or junction boxes linking central controllers with the elements they control and/or their power sources.

Battery-powered or wireless-communication systems are known. Some disadvantages of these systems are the need for replacing batteries, insufficient working voltage and limits of wireless communication.

So-called two-wire irrigation systems use two wires between the main controller and all the controlled elements. A disadvantage of these systems is the use of extensive wiring junctions between main wires and the control elements (sometimes by using a so-called decoder). All these wire connectors have a high risk for potential failure.

The process of installing and maintaining a piping system with a large number of controlled devices can be confusing and difficult.

SUMMARY

Smart piping system, according to embodiments of the present invention, provides a complete solution for fluid flow and electrical communication in modern piping systems.

This system combines piping infrastructure with the electrical infrastructure required for the control and operation of elements, such as water valves, low-voltage lighting fixtures, sensors, and all this, with easy, intuitive installation. In the system, the electrical conductors are placed within the pipes insulated from the fluid flow. The system installation is safe and simple.

Once the system is deployed, the user can quickly connect a node box, effectively at any point along the hose (hose, tube and pipe are used interchangeably). The node box can be connected to a variety of end components (e.g., valves, sensors, lighting fixtures, etc.) and controlled either directly or through the central controller, pre-programmed or in real-time.

The system is highly flexible. It easily allows removal or addition of end components in accordance with any need at the site.

In one embodiment, a water conduit has an integral electrical conductor installed along its length (called a smart pipe conductor). Fittings are provided to maintain water passage together with electrical continuity between the ends of the pipes. This enables distribution and adaptation of pipes to the needs of various sections of the garden or landscape or any other site. Node boxes connect quickly and easily to the smart pipe or other components. Nodes boxes are essentially cases containing electronic circuits connected to transmission lines (the smart pipe conductors).

The system may include an electronic chip or other circuitry that enables data transfer via transmission lines. This method eliminates the need for a large number of transmission lines for the control and operation of systems with an array of end components. Transmission lines use specialized construction such as precise conductor dimensions and spacing, and impedance matching, to carry electromagnetic signals with minimal reflections and power losses. The transmission line may be uniform along its length, and has a characteristic impedance.

The system may include electro-mechanical valves that receive power for operation only by engagement to the smart pipe, thus eliminating the use of external connections between the valve solenoid wires and the power supply wires.

One advantage of the piping system is that the electrical conductor's characteristics can be measured and monitoring in real time. Any changes in these measurements may be related to potential pipe damage that may cause a water leak. The smart piping system alerts for such risks even before the trouble starts and prevents the water waste.

Non-Limiting Summary of Typical System Components:
  A passage for transporting water to various areas.
  An electrical transmission line, e.g., located on the wall of the water pipe parallel to the longitudinal axis of the water passage and used for transmitting power and data communications. The electrical transmission line is made of at least two separate electrical conductors located parallel to the longitudinal axis of the water passage.

A power source supplies the power line directly from batteries or via a voltage converter connected to power source.

End components, which may be off-the-shelf products, may include electronic valves, lighting fixtures and other accessories and sensors for the garden, yard, field, greenhouse and/or animal farm.

Examples of End Components:

Electrically operated water taps

Lighting fixtures

Various sensors such as soil moisture meters, flow sensors, light meters, etc.

Facilities for cultivating animals

Fountain pumps

A range of safety devices and/or alarm systems

Additional electric elements suitable for outdoor installation that are operated cyclically or which receive information transmitted electrically Nodes boxes (or control boxes, the terms being used interchangeably throughout) command and control the end components. Nodes boxes are essentially cases containing electronic circuits connected anywhere along the smart pipe transmission lines. These boxes establish electrical continuity, so data can be transferred, between the central hub unit and the end components.

Nodes boxes may be connected quickly and easily to the smart pipe. Each node box may contains a chip to transfer data via the transmission line and an option to include a micro-processor chip to control a number of electric relays that themselves directly command or control the end components connected to each relay. Each node box can operate a plurality of relays. Nodes boxes can communicate among themselves or with a central hub unit.

Central hub unit may quickly and easily connect anywhere along the smart pipe. It is configured to control any number of nodes boxes that, in turn, control the end components. The central hub unit may contain a power line communication (PLC) chip or other type of communication chip and a programmable micro-controller.

The central hub unit is located along the transmission line. It is essentially a case containing an electronic circuit connected to the smart pipe transmission line. It establishes electrical continuity for transferring data to and from the nodes boxes. The central hub unit itself can also serve as a central controller or a connection unit between the smart pipe systems components and other external controller or device to control the end components.

One of the options is to include in the central hub unit a measurement device that can monitor in real time the smart pipe electrical transmission lines quality. These measurements are related to potential pipe damage that may cause a water leak. The measurements can be a short circuit, discontinuity, loads electrical transmission lines measurements or more sophisticated frequencies response methods. It is all based on the fact that mechanical defects in the pipe surfaces that may cause water leaks affect the embedded electrical transmission lines, which effects can be sensed and processed.

The communications chip enables data transfer via the electrical transmission line between the nodes boxes and the central hub unit. An example is a power line communication chip, e.g., YITRAN IT700 chip available from Yitran Communications, Beer Sheva, Israel, or other types of communication chips.

Standard plumbing fittings: Plumbing fittings can be used to extend irrigation or heating pipes, repair disconnected water pipes and/or connect to any watering fixture. These components generally have poor electrical conductivity if they made from plastic and high electrical conductivity if they made from metal (brass, steel or other casting materials). All these standard plumbing fittings can be used with the smart pipe system as long as they will not cause a short circuit between the smart pipe conductors or expose it to the surroundings.

Conductive bridges are used to maintain electrical continuity by bypassing standard plumbing fittings or other components that are incapable of maintaining electrical continuity via transmission lines.

Conductive pipe fittings (smart fittings) are used to maintain water passage together with electrical continuity of the main transmission line despite branching off or repair of pipes. For example, cutting the hose to insert pipe line extensions or to repair the hose breaks electrical continuity along the main transmission line. However, conductive hose fittings include electrically conductive materials that restore electrical continuity to the transmission line.

Conductive pipe branches are used to maintain electrical continuity between the main transmission line inside the smart pipe and any electrical extension anywhere along and nearby the smart pipe (even where there is no need for fluid flow). Conductive pipe branch include electrically conductive pieces molded in a plastic body. During the joining procedure the conductive pieces penetrate, or pierce, the smart pipe insulation surface and become with direct contact with the smart pipe transmission line. A sealed strong connection between the plastic surface of the conductive pipe branch body and the pipe external surface is achieved by mechanical tightening, bonding or electro-fusion methods and others. The bonding or other connection ensures that the electrical contacts are fully protected from the surroundings. If thermoplastics materials are used then the pipe branches and pipes can be joined by melting to each other. The contact area between conductors will be fully sealed and not exposed to oxygen, so as to prevent corrosion.

MMI (Man-Machine Interface) may be used to program the central hub unit via a user-friendly user interface, e.g. GUI (Graphical User Interface). It can be a screen attached directly to the central hub unit and/or communicating wirelessly via smart phone, the Internet, etc.

BRIEF DESCRIPTION OF DRAWINGS

The present invention will be understood and appreciated more fully from the following detailed description, taken in conjunction with the drawings in which:

FIGS. 8A and 8B are simplified illustrations of conductive wires embedded in the hose according to an embodiment of the present invention.

FIGS. 9A-9C are simplified pictorial, side-view and sectional illustrations, respectively, of a conductive hose fitting according to an embodiment of the present invention.

FIGS. 14A and 14B are simplified illustrations of a control box according to another embodiment of the present invention.

FIGS. 15a and 15B are simplified illustrations of an inner adaptor according to an embodiment of the present invention.

FIGS. 22, 22A, 22B and 22C are simplified exploded and two different sectional illustrations, respectively, of a conductive pipe fitting connected to ends of smart pipes according to an embodiment of the present invention.

DETAILED DESCRIPTION

Figure 1:
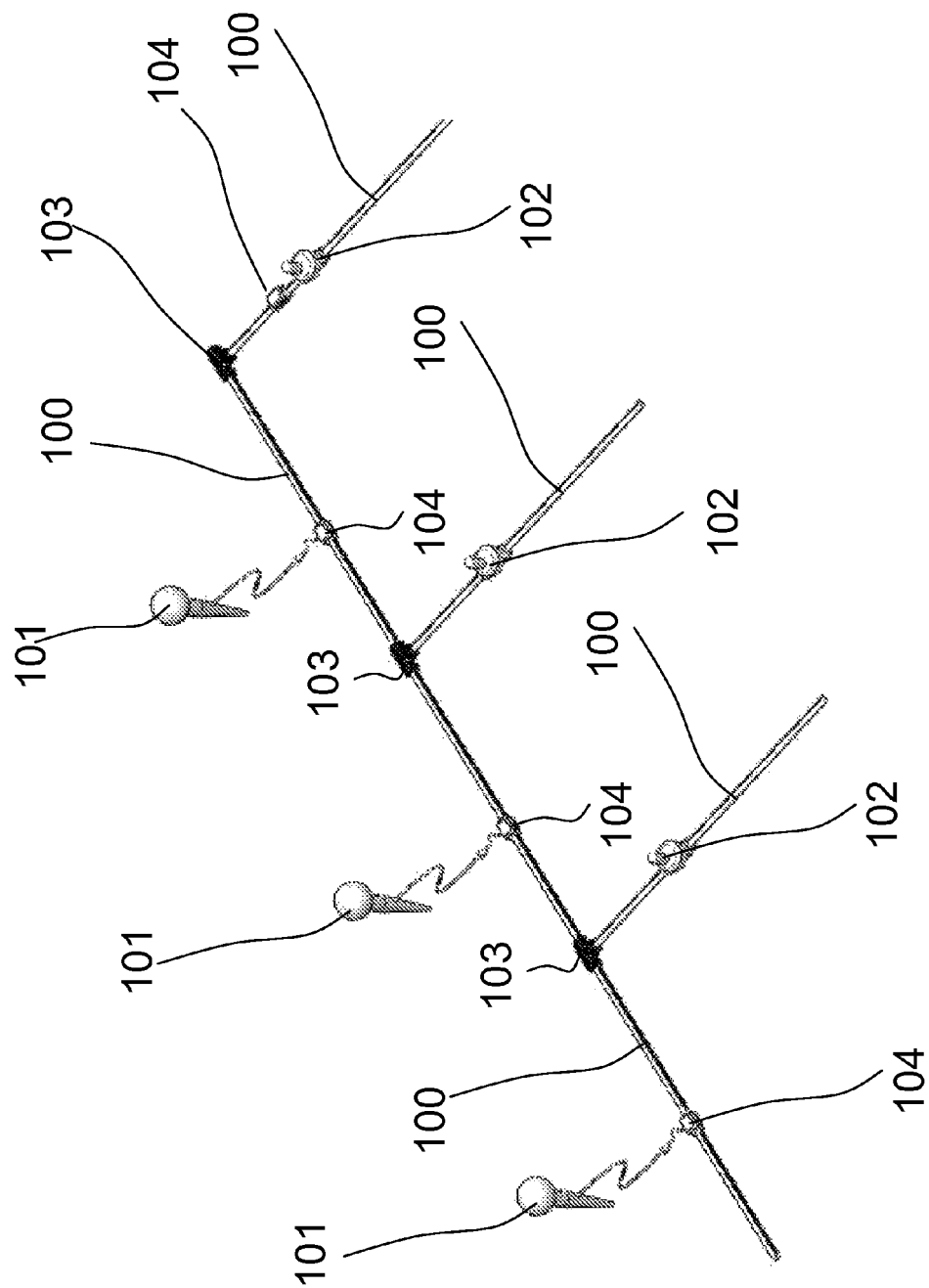
FIG. 1 is a simplified illustration of a smart pipe system according to an embodiment of the present invention.

Reference is now made to FIG. 1, which illustrates a smart pipe system according to an embodiment of the present invention.

Smart hoses 100 are 100 connected through control boxes 104 to operate water valves 102 or other end components 101 (such as lights, transmitters, receivers, flow meter, etc.). The system may use conductive hose fittings 103. One example of an end component is an alarm that warns of a leak in the pipe—the alarm is set off by the control box or other controller sensing a break in the circuit or change in circuitry characteristics (e.g., resistance or capacitance).

Figure 2:
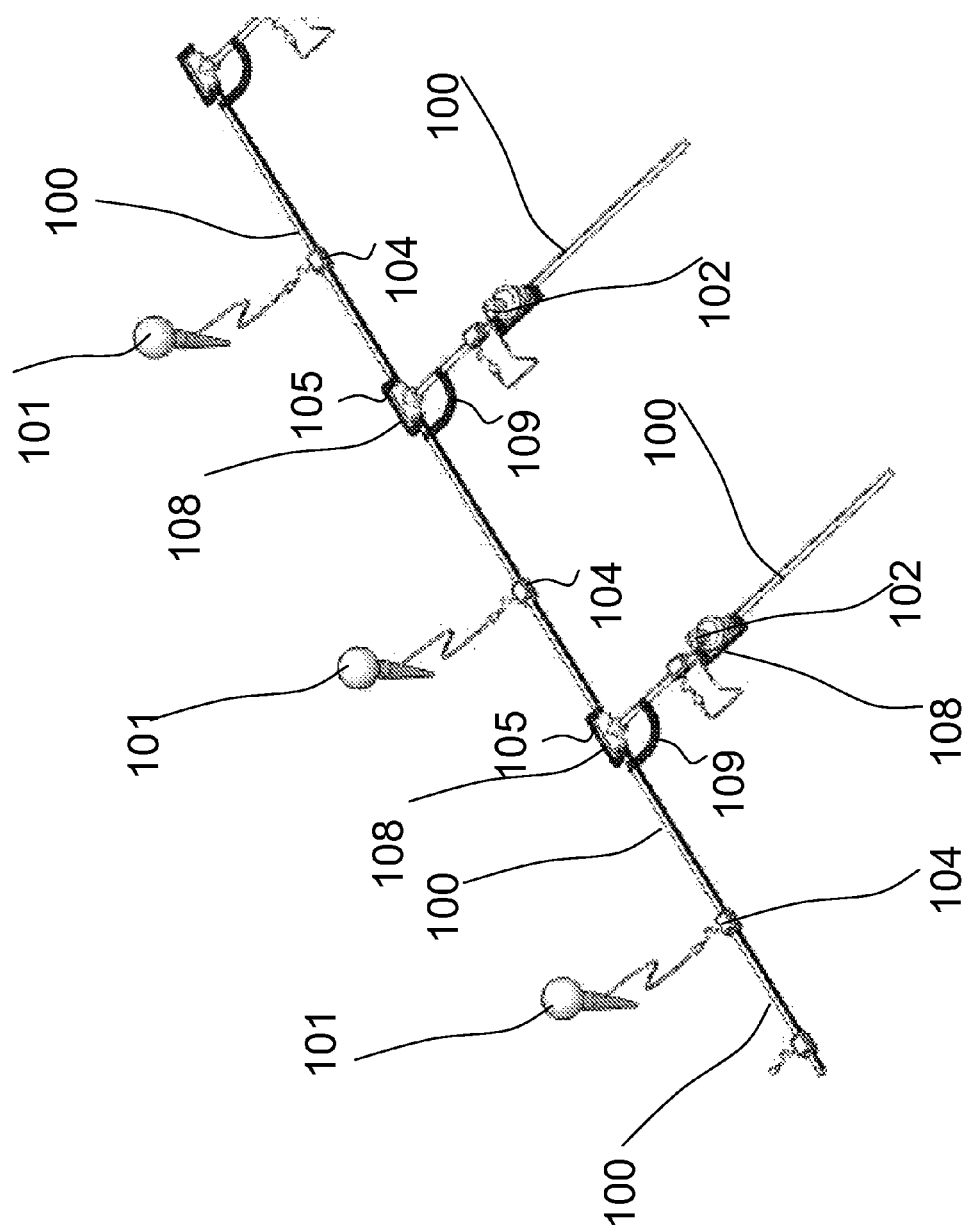
FIG. 2 is a simplified illustration of connection of pipes, control boxes and valves in the smart pipe system according to an embodiment of the present invention.

Reference is now made to FIG. 2, which illustrates connection of pipes, control boxes and valves in the smart pipe system according to an embodiment of the present invention. Smart hoses 100 are connected through control boxes 104 to operate water valves 102 or other end components 101. The system may use standard plumbing fittings 105, but which have the addition of conductive bridge elements that are used to maintain electrical continuity, such as via transmission lines. Shown are conductive bridges 108 used to bridge two in-line smart hoses 100 or to bypass a plastic water valve 102. Another conductive bridge 109 is used to bridge two perpendicular smart hoses 100.

Figure 3:
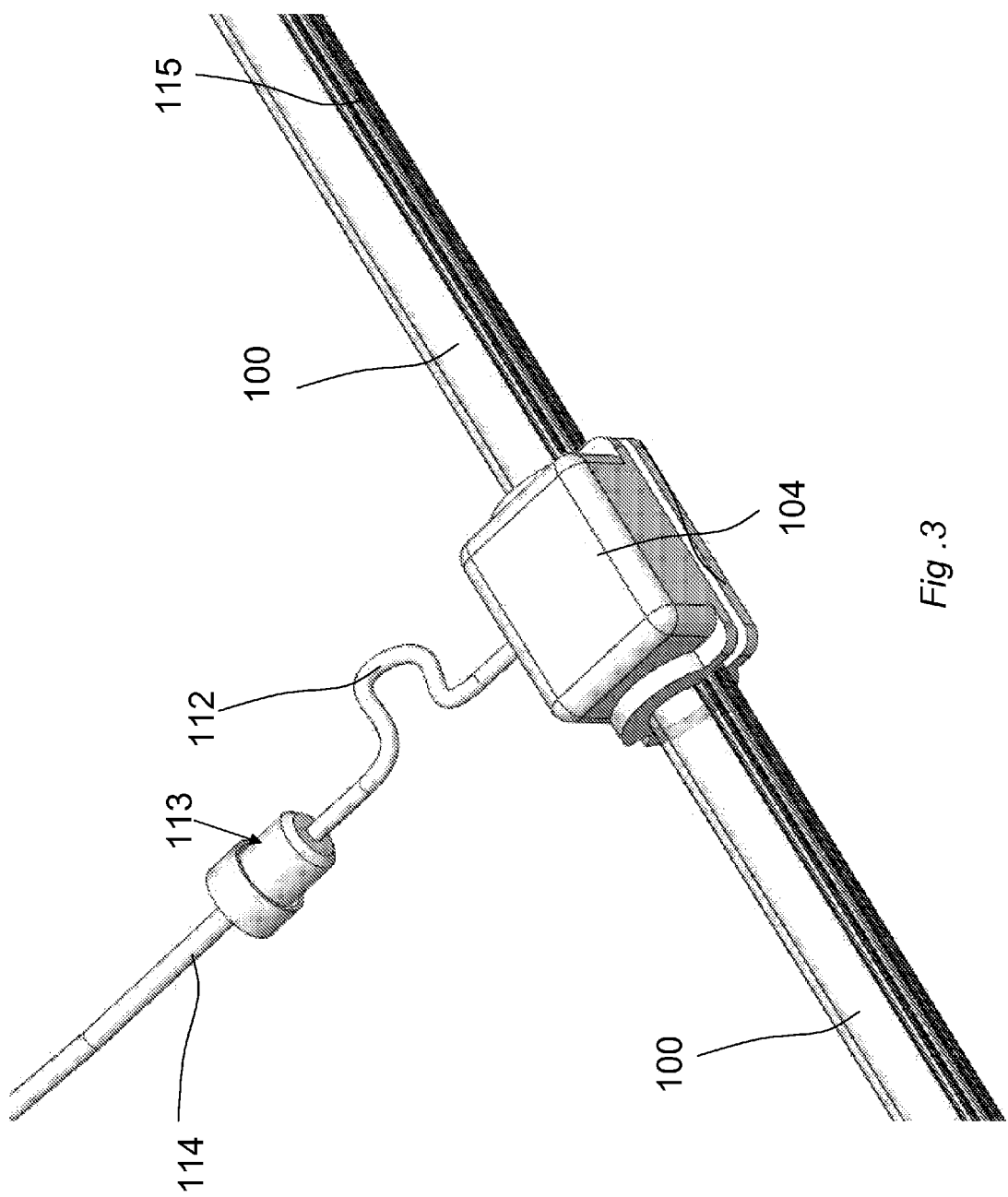
FIG. 3 is a simplified illustration of a smart pipe system according to another embodiment of the present invention.

Reference is now made to FIG. 3, which illustrates a smart pipe system according to another embodiment of the present invention. Control box 104 is mechanically attached to the smart hoses 100 with conductors 115 placed alongside smart hose 100. The output terminal of the control box is an electric cable 112 that supplies power to the end components. An electric connector 113 can be used optionally between the control box cable 112 and the end components cable 114.

Figure 4:
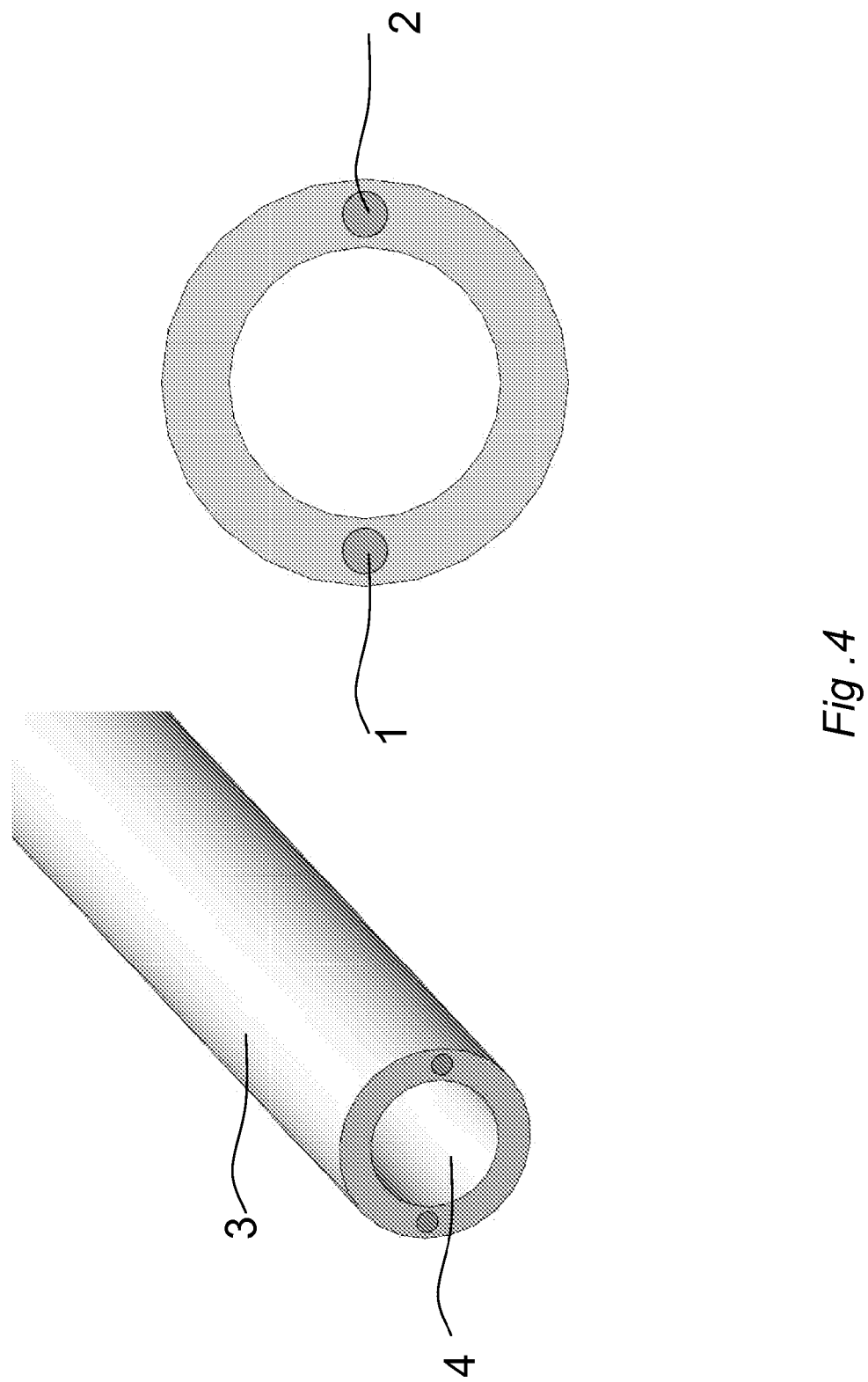
FIG. 4 is a simplified illustration of a hose according to an embodiment of the present invention.

Reference is now made to FIG. 4, which illustrates a hose according to an embodiment of the present invention. FIG. 4 shows a pipe having a water passage 4 with a circular or elliptical wall 3 and conductive wires 1 and 2 disposed within wall 3.

Figure 5:
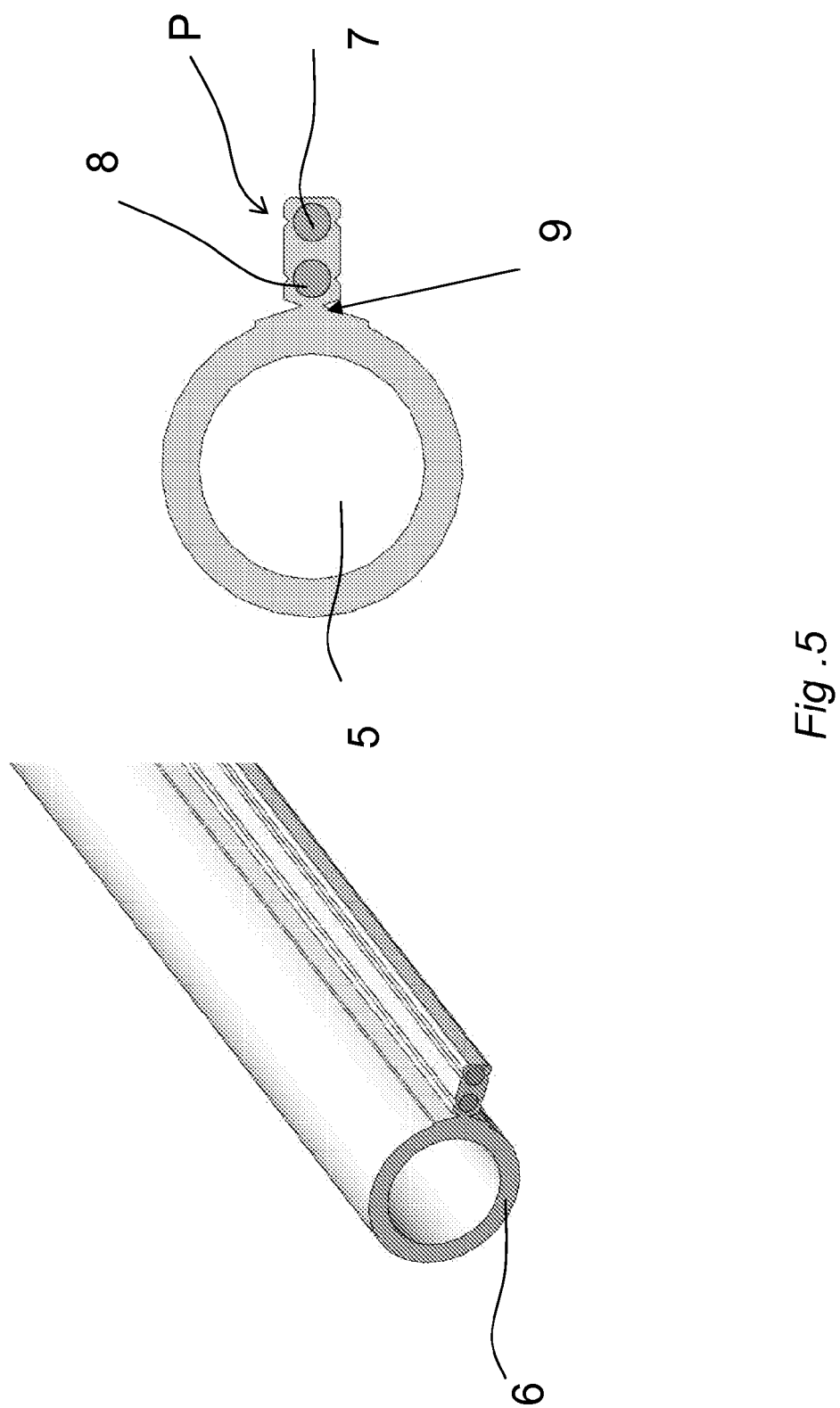
FIG. 5 is a simplified cross-section of the hose according to an embodiment of the present invention.

Reference is now made to FIG. 5, which illustrates the hose according to an embodiment of the present invention. FIG. 5 shows a water passage 5 with a circular or elliptical wall 6 and conductive wires 7 and 8 placed in a protruding extension P alongside the wall. The protruding extension P may include a tapered interface with the main hose which may be broken at breaking point 9 to allow easy separation of the wires from the main water passage.

Figure 6:
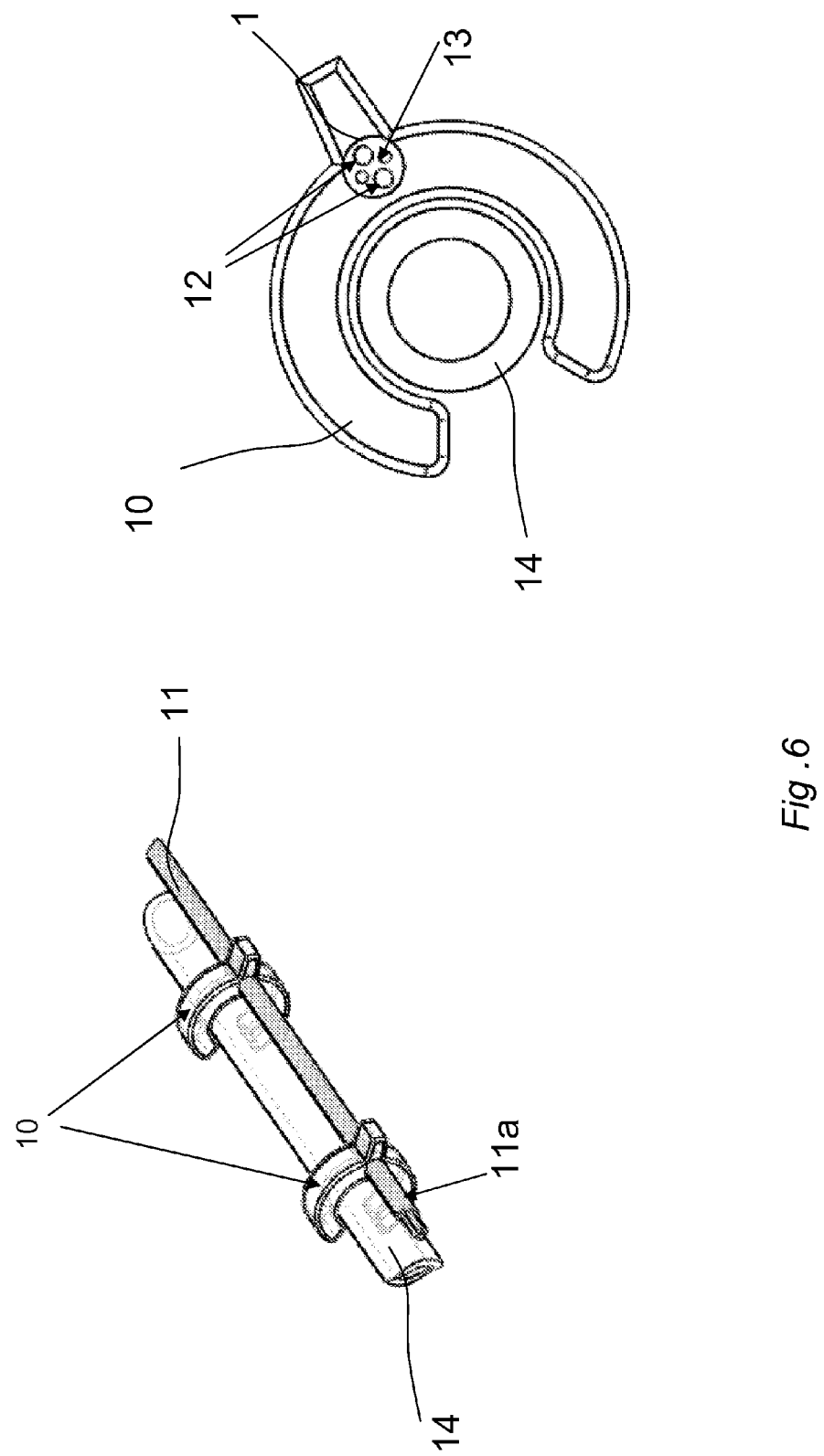
FIG. 6 is a simplified cross-section of the hose according to another embodiment of the present invention.

Reference is now made to FIG. 6, which illustrates the hose according to another embodiment of the present invention. FIG. 6 shows a water pipe 14 and an electric cable 11 attached to it with a mechanical clip 10. The conductive cable 11 can include double wires, wire bundles or other types, and may contain two or more insulated conductors. In another example, the electric cable includes two bundle wires for power transmission and two smaller cross section wires for data transfer 13 surrounded by an insulation material 11a. The mechanical clip may be molded on the electric cable surface.

Figure 7:
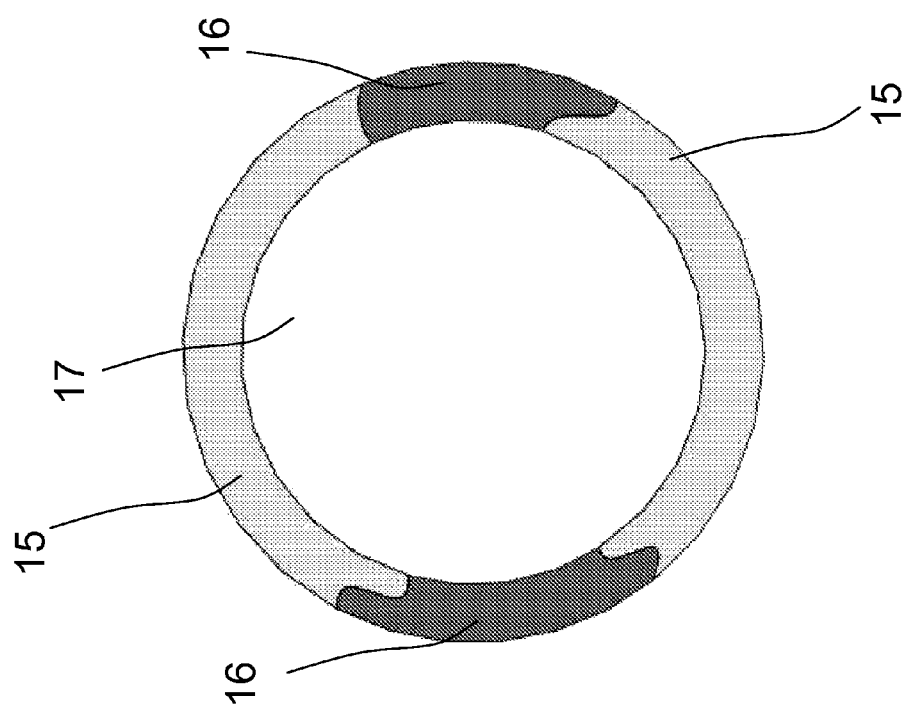
FIG. 7 is a simplified cross-section of a water passage of the hose according to an embodiment of the present invention.

Reference is now made to FIG. 7, which illustrates a water passage of the hose according to an embodiment of the present invention. FIG. 7 is a cross section of a circular or elliptical water passage 17. The hose is made of a combination of materials that create two conductive zones 16 separated by non-conductive zones 15 along the length of the hose.

Reference is now made to FIG. 8, which illustrates conductive wires 16 embedded along the wall of a hose 17.

Reference is now made to FIGS. 9A-9C, which illustrate a conductive hose fitting 20 according to an embodiment of the present invention. The conductive hose fitting 20 is connected to two ends of smart hoses 25. An end 21 of the hose 25 is inserted up to a stop 22 of fitting 20 (FIG. 9C). Fitting 20 includes a conductive plate 24 to keep electrical continuity between the ends of hoses 25 and exposed external electrical contacts 23. The inner part of the hose fitting 20 is used as a water passage 19.

Figure 10:
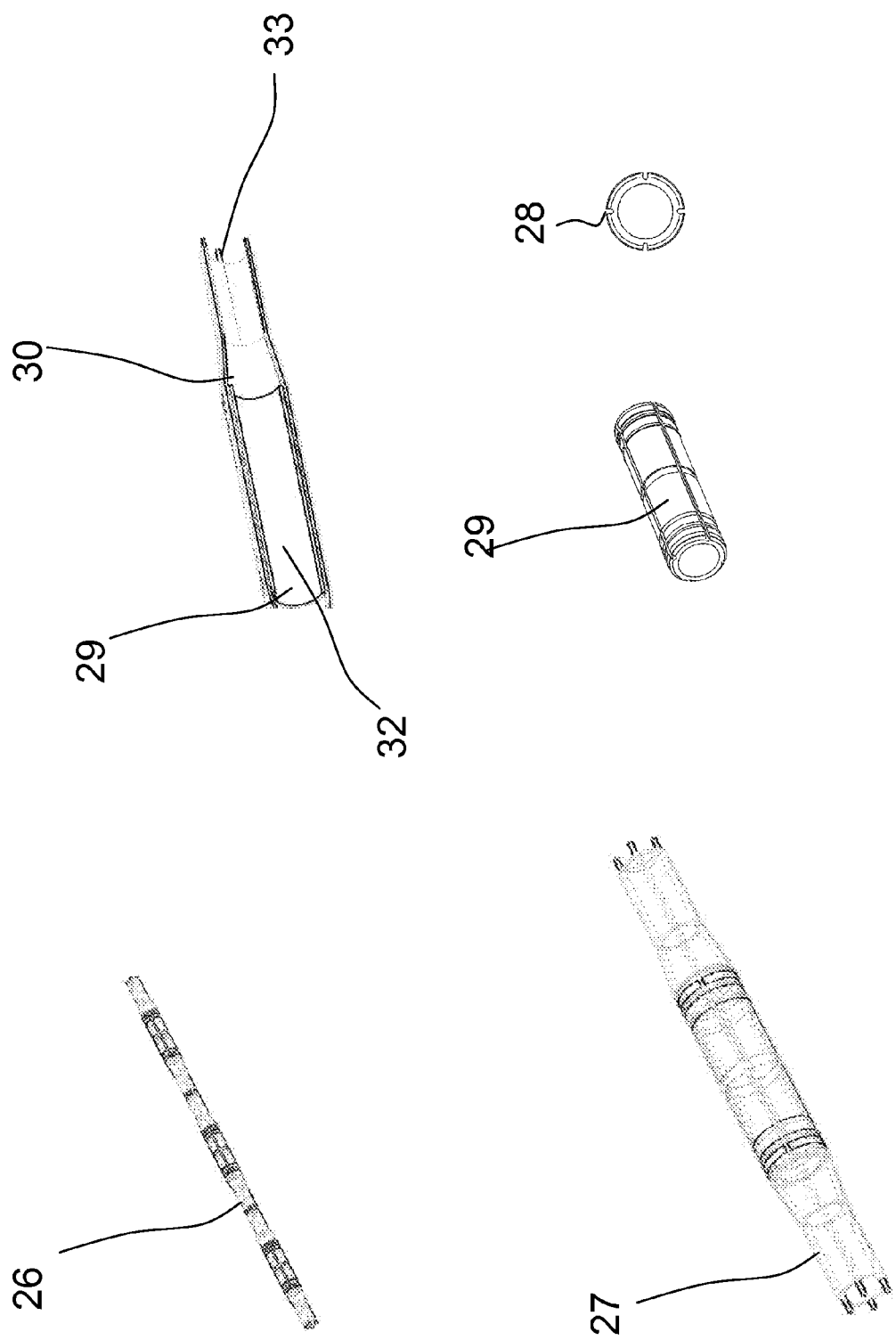
FIG. 10 is a simplified illustration of conductive wires along the hose according to an embodiment of the present invention.

Reference is now made to FIG. 10, which illustrates conductive wires 33 along a hose 27 according to an embodiment of the present invention. An inner adaptor 29 includes slots 28 to hold the conductors 33. The inner adaptor 29 may contact an inner surface 30 of hose 27 to secure it in place and maintain sealing. The inner part of the adaptor is used for water passage 32.

Figure 11:
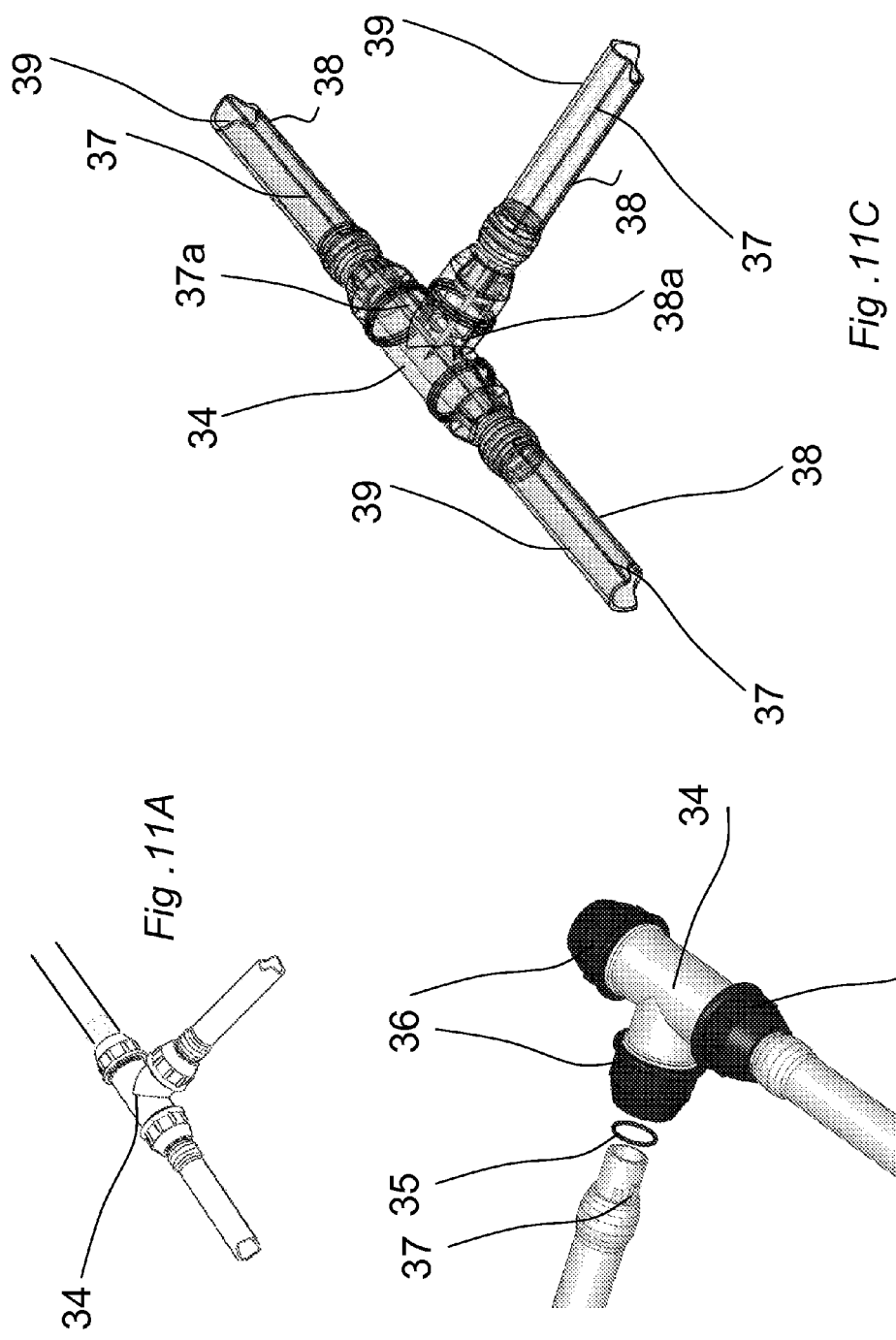
FIGS. 11A-11C are simplified illustrations of a conductive hose fitting according to an embodiment of the present invention.
Figure 12:
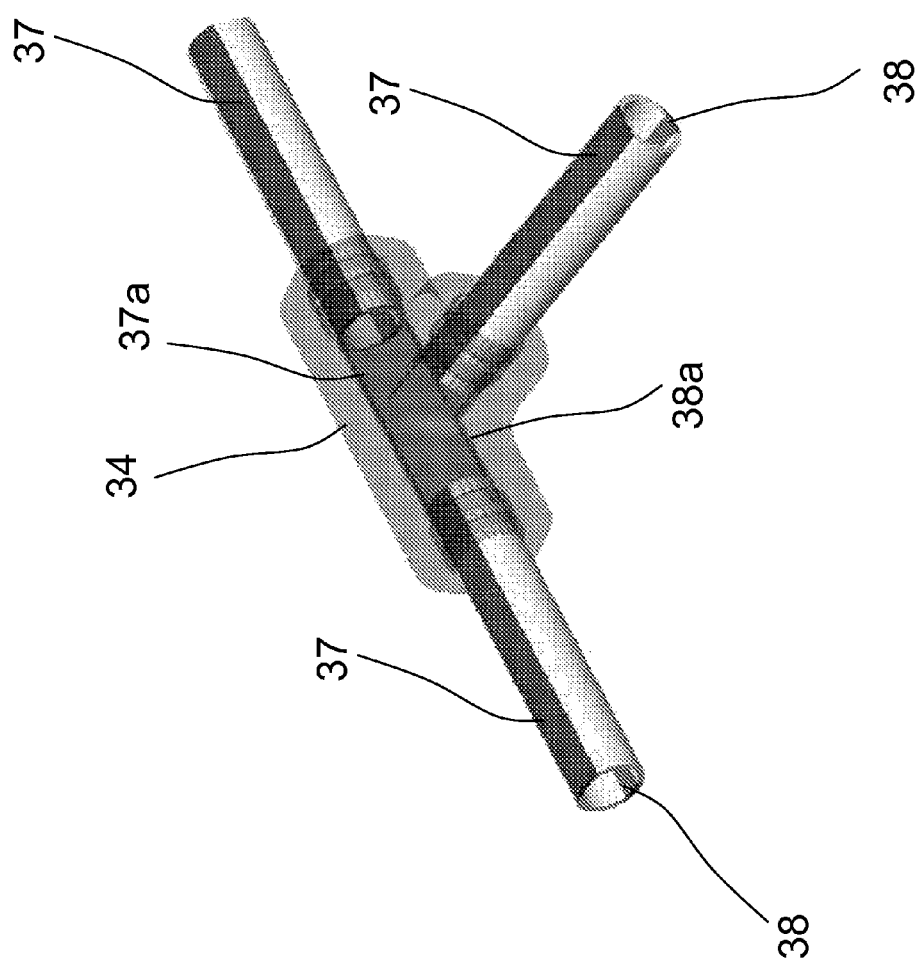
FIG. 12 is a simplified illustration of a conductive hose fitting according to an embodiment of the present invention.

Reference is now made to FIGS. 11A-11C, which illustrate a conductive hose fitting 34 according to an embodiment of the present invention. The conductive hose fitting 34 is connected to ends of smart hoses 39. Inner conductive pieces 37a and 38a may be molded into fitting 34 to ensure electrical continuity between two different hose wires 37 and 38. The hoses 39 fit into fitting 34 and the water pressure may be sealed by a seal (O-ring) 35. An external nut 36 is used to tighten the electrical contact area. In order to ensure the orientation of the hose ends (that is, to align the conductors) there is a mechanical protrusion 37 that guides the hose ends when engaging with fitting 34. FIG. 12 illustrates conductive hose fitting 34 connected to ends of the smart hoses.

Figure 13:
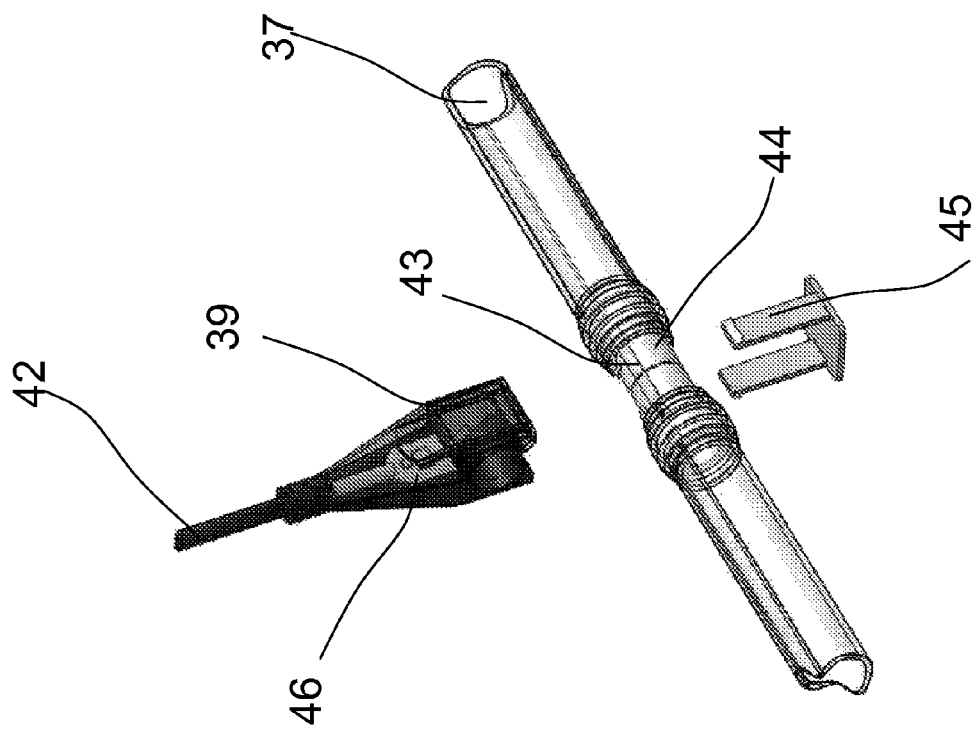
FIG. 13 is a simplified illustration of a control box according to an embodiment of the present invention.

Reference is now made to FIG. 13, which illustrates a control box 39 according to an embodiment of the present invention. Control box 39 may have a circuitry card (PCB) 46 which can be connected to external components (not shown) with a wire 42. The control box 39 connects quickly and easily to a hose adaptor 44 and may be secured by a clip 45 or screws. After the control box 39 is in place there is electrical continuity between conductive lines 43 of smart hoses 37 and contact points of PCB 46.

Reference is now made to FIGS. 14A and 14B, which illustrate a control box 46A according to another embodiment of the present invention. The control box 46A may have a top housing 47A and a base 48A. By tightening top housing 47A and base 48A together, solid metal contacts 49 are forced to engage through a relatively soft wall of smart hose 55. The contacts 39 are in electrical contact with electrical transmission lines 50 and a PCB 54 inside control box 46A. Correct orientation of control box 46A may be achieved by means of a mechanical protrusion 51 of top housing 47A which fits in a matching groove 52 in hose 55.

Reference is now made to FIGS. 15A and 15B, which illustrate an inner adaptor 56 according to an embodiment of the present invention. The adaptor 56 contains electrical contacts 57 that connect the conductive wires in the hose 58 to any electrical contacts located externally to the hose. The adaptor itself may be made of a hard polymer that can be broken or cut at a defined location 59 and used as a hard contact piece to combine water sealing together with electrical contact that saves the user from dealing with exposed wires. FIG. 15A shows adaptor 56 as one complete unit forming a continuous hose, whereas FIG. 15B shows adaptor 56 separated into two pieces 56a and 56b.

Figure 16:
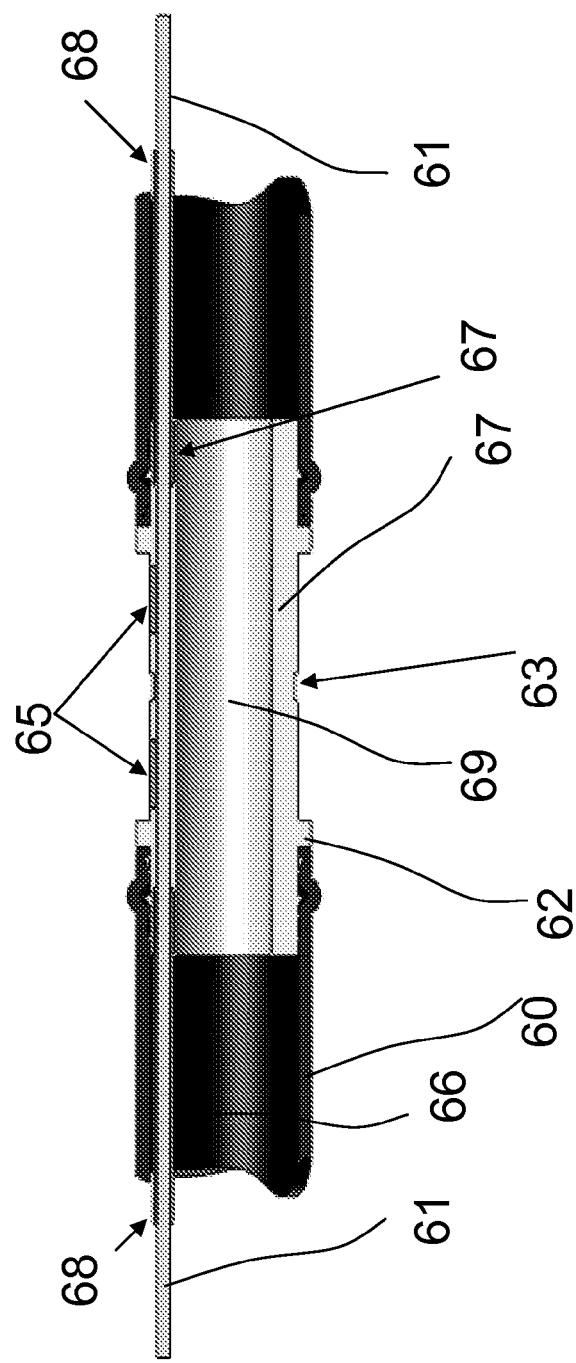
FIG. 16 is a simplified illustration of a pipe coupler according to an embodiment of the present invention.

Reference is now made to FIG. 16, which illustrates a pipe coupler 67 according to an embodiment of the present invention. The pipe coupler 67 has a water passage 69 and a passage 68 for electric conductors 61. The passage 68 may extend up to a positioning mark 62. Electric conductors 61 are insulated from water passage 69 by an insulator 66. Electrical conductors 61 are in electrical contact with external contacts (terminals) 65, which ensure electrical continuity between the hose inner conductive wires and the external terminals while maintaining good sealing. The pipe coupler 67 includes a center mark 63 to guide the user to cut it at the proper designated place.

Figure 17:
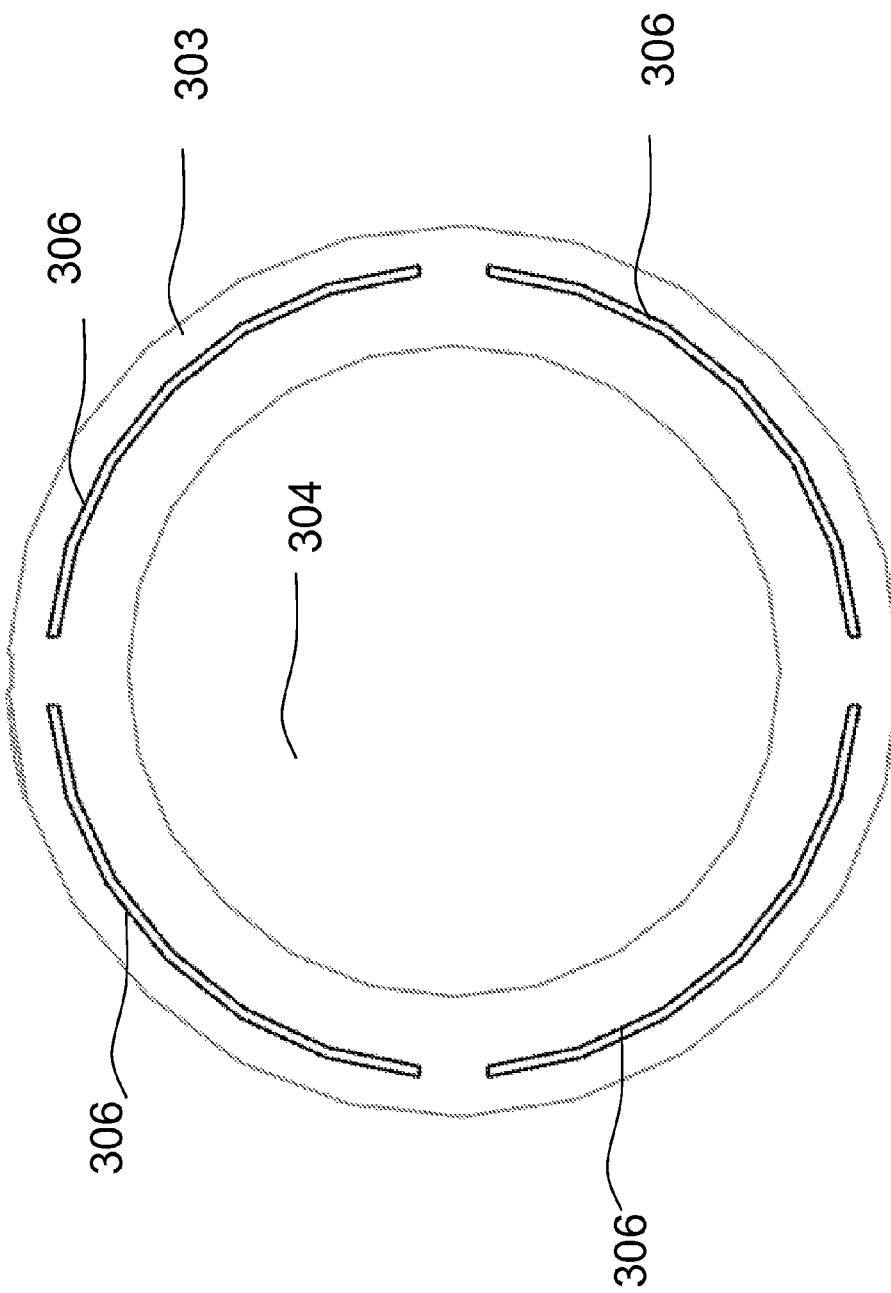
FIG. 17 is a simplified illustration of a smart pipe according to an embodiment of the present invention.

Reference is now made to FIG. 17, which illustrates a smart pipe according to an embodiment of the present disclosure. FIG. 17 shows a pipe having a water passage 304 with a circular or elliptical wall 303 and a conductive 306 transmission lines embedded within the wall. The conductive are made of aluminum foil, copper or other conductive material.

The use of flat shape foil conductive instead of round solid shape conductive enable relative large cross section area of the conductive with the constrain of minimum pipe wall thickness. The relative large surface area of the conductors enable simple fitting to an external branch without the need for carefully matching in order to insure continues and reliable electrical contacts.

Figure 18:
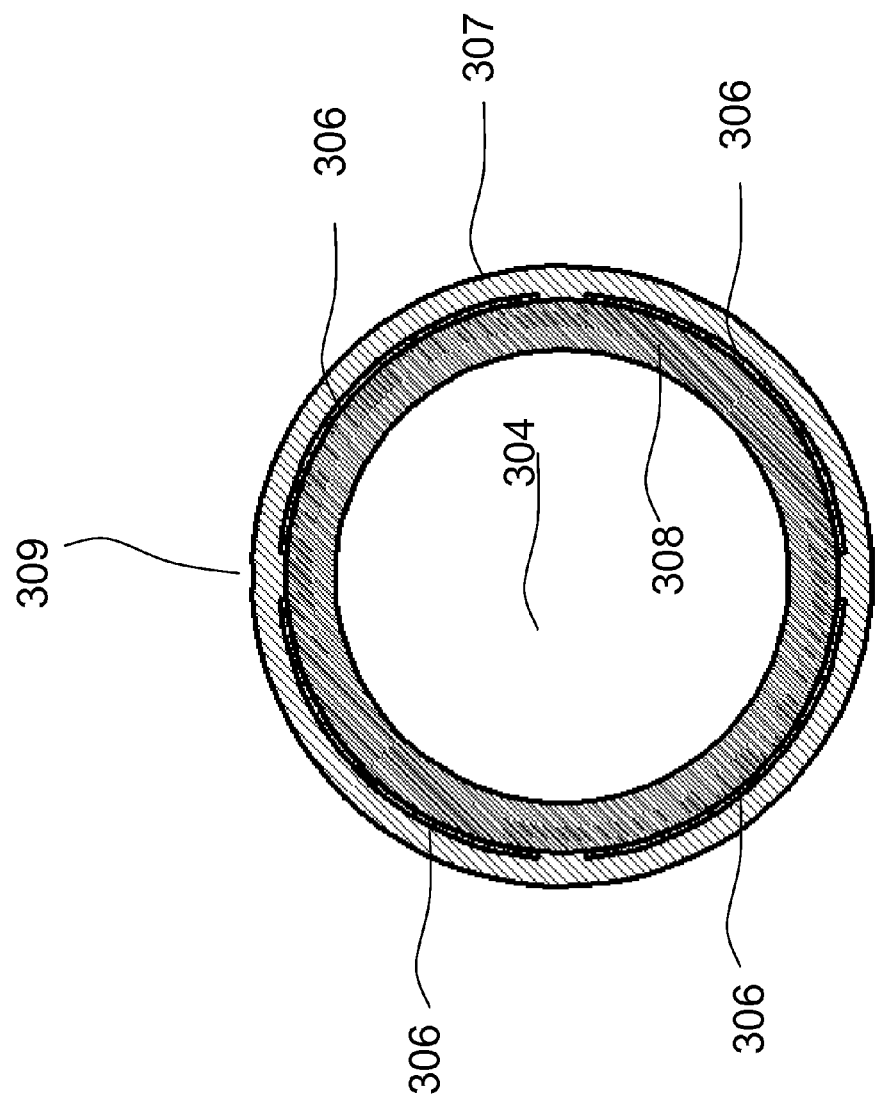
FIG. 18 is a simplified illustration of a smart pipe according to another embodiment of the present invention.

Reference is now made to FIG. 18, which illustrates a smart pipe according to an embodiment of the present disclosure. FIG. 18 shows a pipe having a water passage 304 in an inner plastic pipe 308 the conductors 306 glow on the outer surface of the inner pipe. And an outer plastic layer 307 extruded around it to produce a round pipe.

Figure 19:
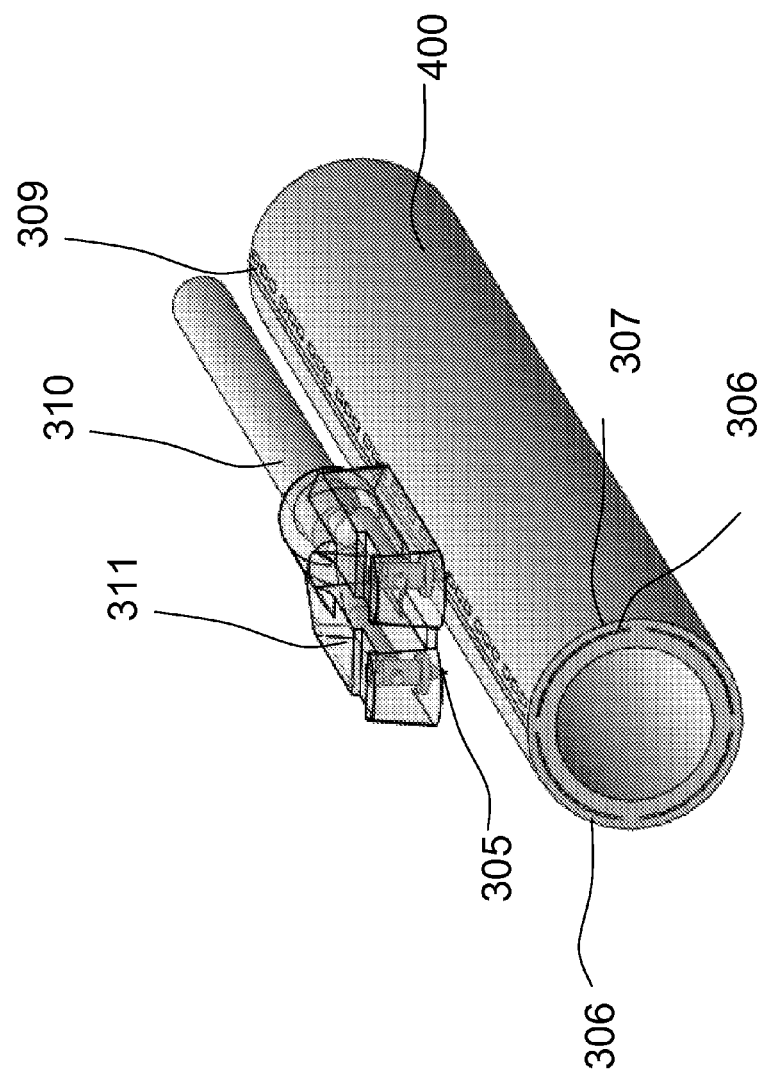
FIG. 19 is a simplified illustration of a smart pipe according to another embodiment of the present invention.

Reference is now made to FIG. 19, which illustrates a smart pipe according to an embodiment of the present disclosure. A conductive pipe branch 310 shown in a position before it attached to the smart pipe. During the joining procedure the conductive pieces 305 penetrate or pierce the smart pipe insulation surface 307 and become with direct contact with the smart pipe transmission line 306. A sealed strong connection between the plastic surface of the conductive pipe branch body 311 and the pipe external surface achieved by external tightening forces that force the conductive pipe branch flexible plastic body 311 to the shape of the pipe. The two parts 310 and 311 joined by melting or gluing.

On the outer surface there may be a mark 309 that is related to the conductor's 306 inner position along the pipe, which guides the user for correct installation.

Figure 20:
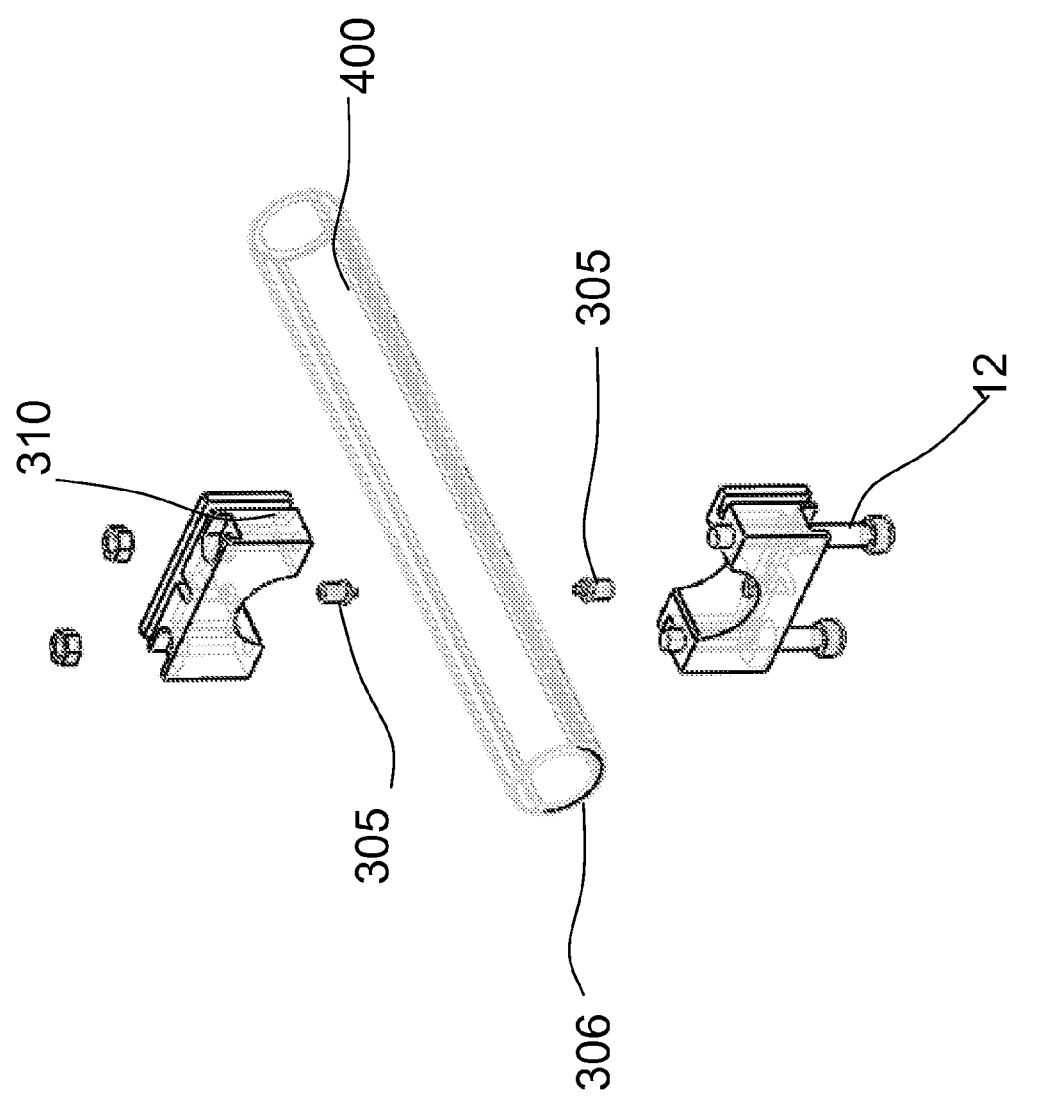
FIG. 20 is a simplified illustration of another conductive smart pipe branch according to another embodiment of the present invention.

Reference is now made to FIG. 20, which illustrates another conductive smart pipe branch 310 shown in a position before it is attached to the smart pipe. During the joining procedure the conductive pieces penetrate 305, or pierce, the smart pipe insulation surface and become with direct contact with the Smart pipe transmission line 306. A sealed strong connection between the plastic surface of the conductive pipe branch body 310 and the pipe external surface achieved by screws 312 this type of connection allow simple installation of sealed and protected electrical branches anywhere along the smart pipe.

It is noted that the material of the smart pipe's external layer, which serves as the insulation for the conductors, may be, without limitation, a cross-linked polyethylene (PEX), which has superior resistance to high temperatures (up to 90° C.). High temperatures can be encountered not only from the surroundings or water flowing inside the pipe, but also from heat generated in the conductive lines due to electrical resistance. Connectors of the present invention can be based upon compression fitting for PEX with the addition of the electrical conductivity feature unique to the invention.

Figure 21:
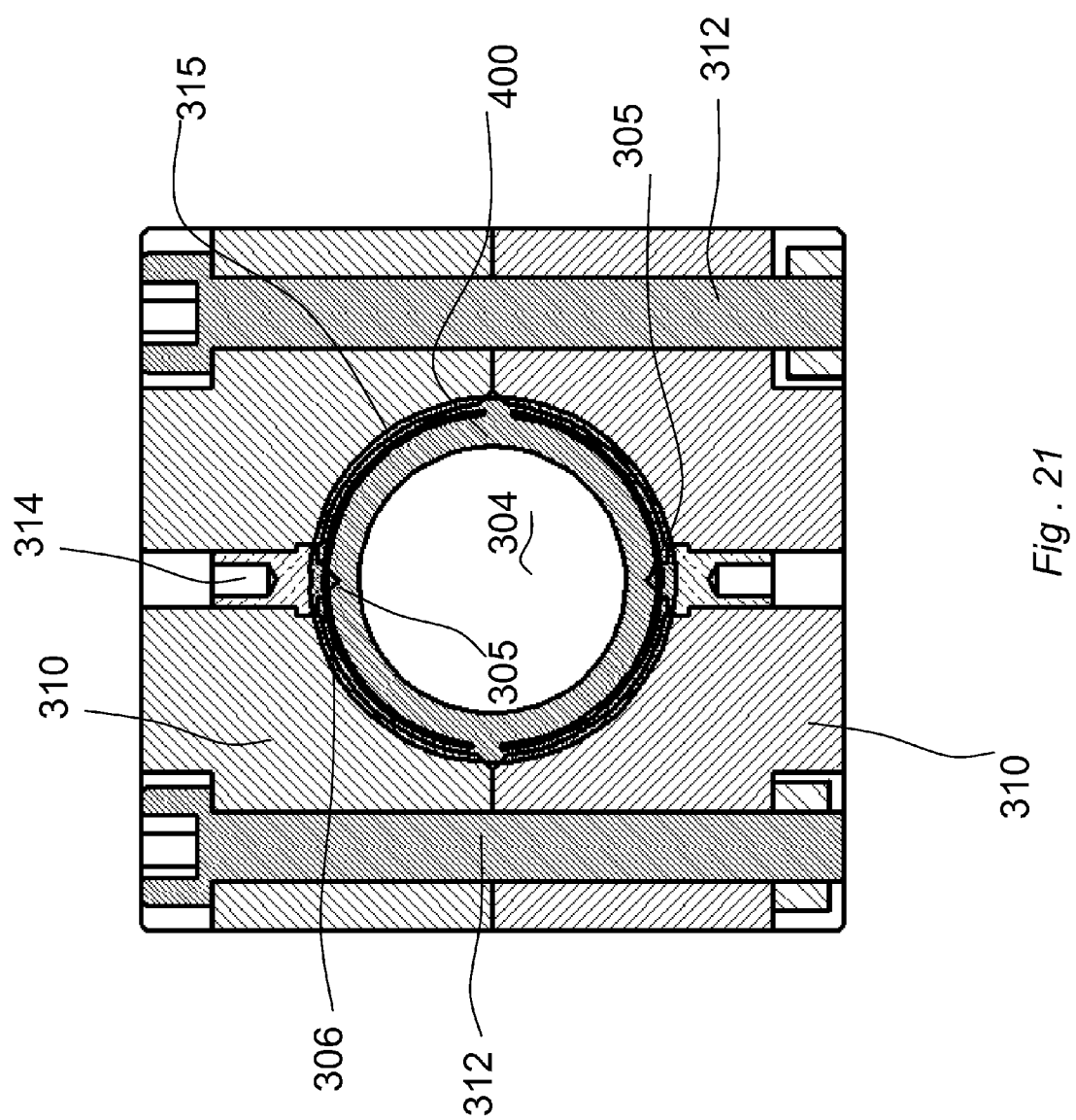
FIG. 21 is a simplified illustration of the conductive smart pipe branch after attachment to the smart pipe.

Reference is now made to FIG. 21, which illustrates the conductive smart pipe branch 310 shown in a position after it is attached to the smart pipe. During the joining procedure the conductive pieces 305 penetrate or pierce the smart pipe insulation surface and directly contact the smart pipe transmission line 306. The conductive pieces 305 penetrate the pipe outer surface but do not punch the inner pipe in a way that interrupts the water passage 304.

Figure 22:
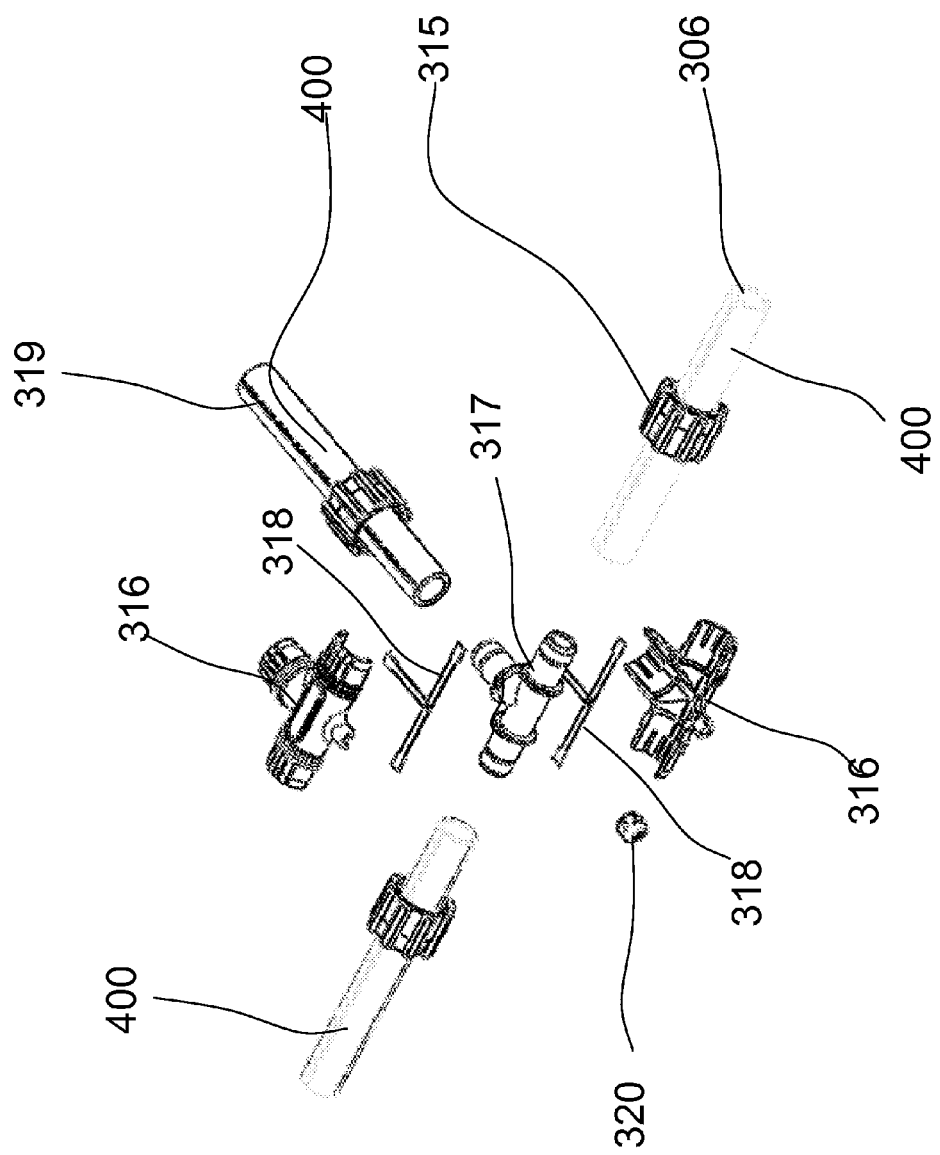

Reference is now made to FIGS. 22, 22A and 22B, which illustrate a conductive pipe fitting 317 to connect ends of smart pipes 400. Fitting 317 is a T-fitting in FIG. 22A with three branches; however, optionally fitting 317 could be a straight or in-line fitting with two branches (the fitting could have more than three branches as well). Each branch includes a seal (e.g., O-ring) 317A and an abutment 317C. Each branch includes a conductive member 318 (such as a transmission line) disposed in a connector body 316 (which can be made of two halves as seen in FIG. 22). There is a gap between the inner circumference of the connector body 316 and the outer circumference of the branch of the fitting 317. A smart pipe 400 is inserted in this gap (like a PEX compression fitting or push-fit fitting). A fastener 315, such as a nut 315 (or screws or snaps), is used to tighten the connection between the pipe 400 and the fitting 317. When the nut 315 is tightened or when the pipe is pushed axially into the fitting gap, it forces a portion of conductive member 318 (such as a serrated portion 318A seen in FIG. 22B and 22C) to pierce or otherwise pass through the external insulating wall of pipe 400 until electrical connectivity is achieved with smart pipe transmission line 306 (FIG. 18). Nut 315 may also have a seal (e.g., O-ring) 315A, which protects the electrical connection from the environment. The seal 317A ensures a water-tight seal for fluid to flow through pipe 400, while at the same time insulating the electrical connection between the conductive lines of the branches and the pipes from the fluid flow. FIGS. 22A and 22B show the connector (fitting 317) connected and tightened to the smart pipes with nut 315. Tightening the nut creates a good water-tight seal plus good electrical connectivity between the conductors of the pipes and other electrical components, which are insulated from the water flow. The portion of conductive member 318 which pierces the pipe 400 helps prevent axial forces from disrupting the seal. In order to keep the orientation of the hose ends there is a color line 319 (or other mark) to guide the hose ends when engaging to the fitting 317. There is an inner volume 321 between fitting 317 and connector body 316 as shown in FIG. 22A which is distanced from ends of the pipes 400. Electrical components and/or PCB's may be placed in volume 321. Optionally, a connector port 320 is provided at volume 321 for further electrical components or connections. Optionally, fitting 317 can be molded directly on conductors 318 with no need for connector body 316.

Installation and Operation Once the hoses are deployed in the garden, the user may connect a node box (connector box) at any point along the hose with no need for additional electrical wiring or power cable infrastructure. All Control Boxes can be connected to, operate and control a wide range of end elements.

Similarly, the Central Control Unit can be placed wherever along the hose the installer feels would be the most convenient location from which to monitor and control all the system elements. All data between the Central Control Unit and the Control Boxes is transmitted via the electrical transmission line with no need for additional electrical or communication cables or wireless communication.

A Power Source can also be installed anywhere along the water pipe route. The voltage supplied to the main transmission line is generally 12, 24 or 48 volts DC or AC. It would preferably be less than 50 volts, varying as per the needs of the system, for safety reasons. It is not necessary to place the power source near the central control unit; rather the power source can be place at any convenient place. More than one power source can be connected.

Once the system is operational, all communications and power are transmitted via the electrical conductors extending along the length of the hose. Connecting the Control Boxes exposes the electrically conductive contacts of the chip located inside the Control Boxes and establishes electrical continuity for transfer of data and power between the Central Control Unit and the Control Boxes. Each Control Box contains a number of relays that enable the Central Control Unit to control the End Components via the Control Boxes. Each End Component is identified by the Central Control Unit by a unique address.

Since each Control Box may include its own microprocessor chip and a clock, Control Boxes can be used independently to communicate with other Control Boxes for coordinating timing, transmission of system error messages, initial programming of work cycles and/or programming changes. This type of system eliminates the need for a Central Control Unit.

The user interface enables the user to program the system as per his requirements. Once initial programming is complete, he can disconnect the user interface and allow the system to function independently.

This flexible system easily accommodates the future addition and/or removal of Control Boxes and/or end components with no need for additional electrical wiring or infrastructure.

Hundreds of boxes can be installed to operate end components set at a variety of distances from the Central Control Unit.

Additional System Configuration Features

In some examples electrical transmission conductive line may be placed within the pipe wall so the raw material of the hose can provide insulation between the electrical conductors.

In other examples, the electrical transmission conductive line can be placed in the pipe wall so the raw material of the hose, made from at least two different raw materials, provides additional electrical conductivity.

In yet other examples, electrical transmission conductive line can be placed externally and/or inside the wall of the hose and/or attached to the water hose.

In other examples, the water itself can be used as a conductor for transmitting electrical signals and transferring data.

The electrical conductor located within the pipe wall can be distributed symmetrically or asymmetrically along one or more conductive wires.

The cross-section of the electrical conductor can be configured in various shapes.

The transmission line would typically be suitable for handling low voltage. Therefore, the user can handle a tube having a bare conductor with no risk of electrocution and install it in such a way so as to prevent short circuits and unintended disconnections.

The longitudinal axis of the tube may correspond to the longitudinal axis of the transmission line.

One or more of the electrical conductors can be installed in the pipe walls in a spiral configuration so there will be no direct contact between electrical conductors placed side by side.

The structure of the Smart Irrigation Hose is such that the insulating material between the two electrical conductors leaves a hollow structure to allow water to flow. The longitudinal axis of the electrical conductors is parallel to the longitudinal axis of the water flow.

The dedicated waterway connections are designed to create and maintain electrical continuity via the main transmission line of at least two electrical conductors that are insulated from one another.

In some examples electric water valves may include electro-magnetic valves. These valves can contain an integral communication and control component that can connect directly to the transmission line. Therefore, no external electrical wiring is needed in order to install it on the Smart Irrigation Hose lines.

Transmission lines in the hose wall are positioned to create and maintain proper electrical continuity between Smart Irrigation Hoses regardless of the relative orientation of the two hoses, i.e. whether the hoses are situated parallel, perpendicular or at a different angles to each other.

Conductor hose fittings allow two or more Smart Irrigation Hose to be connected to one another with good and correct electrical continuity regardless of the rotational orientation of the Smart Irrigation Hoses.

Conductor hose fittings include a mechanical sealing element based on water pressure within the hose and a mechanical gripping element against the pipe wall.

After system installation, the user can initiate operation of each end component by "tagging" it via the operating system so the system can identify which components are connected to it and what function they serve, e.g. lighting or water tap. From that moment, each end component has a unique address that the Central Control Unit can use to identify it and direct its operation cycle.

After system installation, the system detects the end components and designates a unique address to each end component automatically.

Any disconnection along the transmission line causes the Central Control Unit to lose communication with the Control Boxes in the area located beyond the point of the rupture. This results in an error reading in the Central Control Unit with the option of automatic closure of the main valve line or of those valves that supply water to the damaged area. Simultaneously, a message can be sent automatically via SMS or other means to notify the user of a system malfunction.

Each end component transmits its status (e.g. closed, open or in transition) to the Central Control Unit so that the status of the end components is always accessible via the user interface.

The Central Control Unit can also be operated as a Control Box and, thus, can directly control a number of end components.

The system enables the performance of an accurate assessment of end component installation including the option to initiate operation of each end component separately by mechanically pressing a button.

Product Options

Connection of various sensors to the Control Boxes and transfer of any communications received via two-way communication between the Control Boxes and the Central Control Unit: These communications affect changes in the work program established by the operator.

Options for sensors include measurement of: temperature, light intensity, soil saturation, humidity, wind intensity, etc.

Smart home interface, for example, operating garden lights according to the Google Sun Chart Expanding distribution by using amplifiers, i.e. by adding electric signal amplifiers along the transmission line: This would enable the system to be spread out over several kilometers while maintaining communication signal power. Under normal conditions, the greater length and electrical resistance in the transmission line would cause the signal to weaken.

Receiving alerts via phone re: system failure, etc.

Turning lighting on and off proactively via a special home or mobile operating unit Randomized activity cycle, especially for garden lighting A website providing support and professional advice to clients, including programming and garden lighting simulations The system is suitable for private gardens, public gardens, crops, systems for raising animals and industrial uses.

Benefits

Time and Financial Savings: The entire installation includes both water pipes and low voltage electrical infrastructure, resulting in significant savings in both time and materials that would otherwise be required to install two parallel infrastructure systems.

Safe low-voltage operation: Since the system operates at low-voltage (less than 50 volts) at no time is anyone or anything in contact with the system exposed to voltages that could cause harm.

Simple installation: The system design eliminates the need for installation by a qualified electrician or an experienced professional. Anyone can install the system with no special knowledge of electrical wiring.

System flexibility: Even after the initial installation, additional end components can be installed anywhere the hose is deployed with no need for additional power cable infrastructure.

Efficient use of space, water and electricity: As opposed to today's battery-operated water taps that must be located near the Central Control Unit and the central water source, this system enables taps and pipes for transporting water to take up a smaller area. This results in reduced use of hosing, water and electricity for increased cost-effectiveness.

Fast, effective regulation and repair: Real-time, two-way communication between the Central Control Unit, Control Boxes and end components enables real-time monitoring of performance, integrity, system health and data processing. Loss of contact between sections may indicate a disconnected hose or a leak. Thus, the system enables the operator to close the main taps remotely to prevent water waste and flooding damage.

Rugged, durable and trouble-free: Placing the electrical conductors within the hose and using specialized plumbing connectors eliminates the problem of loosening wires. It maintains system aesthetics, and increases resistance to mechanical injuries, damage and corrosion that could cause system failures.

Minimal wiring installation errors: Since the connectors are designed to create and maintain electrical continuity no matter what their orientation, use of the smart plumbing connectors prevents electrical wiring errors.

Maximal creative expandability: The system is designed to enable the use of components and plumbing fixtures on the market without requiring the use of special components except for the standard system Control Boxes and the components necessary for maintaining electrical continuity through the transmission line.

"Green", healthy technology: The system transfers data directly via the transmission line rather than employing electromagnetic radiation- producing wireless technology. In the Western World today, many people are expressing concern about the long-term health consequences of prolonged exposure to electromagnetic radiation.

The invention claimed is:

1. A system comprising:
pipes, each of which has a pipe passageway for fluid to pass therethrough and electrical conductors insulated from said pipe passageway;
at least one fluid connector which has a connector passageway for fluid to pass therethrough and electrical conductors insulated from said connector passageway, said pipes being fluidly and electrically connected to said at least one fluid connector;
a fastener that tightens between the pipe and said at least one fluid connector and achieves electrical connectivity between the electrical conductors of said at least one fluid connector and said pipe, wherein said fastener forces a portion of said electrical conductor of said at least one fluid connector through an insulating wall of said pipe until electrical connectivity is achieved with the electrical conductor of said pipe; and a controller and a power source electrically connected to said pipes, wherein said controller comprise metal contacts in electrical contact with electrical transmission lines in said controller, said metal contacts being said portion of said electrical conductor which is forced through the insulating wall of said pipe.

2. The system according to claim 1, further comprising a guide on at least one of said pipes and said fluid connector that guides engagement and aligns the electrical conductors of said pipe and said fluid connector or of said pipe and said controller.

3. The system according to claim 1, wherein said electrical conductors comprise data transmission lines for communicating with a data source.

4. The system according to claim 1, wherein said electrical conductors are in electrical communication with an alarm that warns of a defect in any of the pipes or a defect in an electrical connection with any of the pipes, said alarm operative to sense change in circuitry characteristics.

5. The system according to claim 1, wherein insertion of said pipes into said at least one fluid connector achieves a water-tight connection and electrical connection.

6. The system according to claim 1, wherein said at least one fluid connector comprises a pipe fitting and a connector body, and wherein each of said pipes is inserted in a gap between an inner circumference of the connector body and an outer circumference of the pipe fitting.

7. The system according to claim 2, wherein said guide comprises a mechanical protrusion, a groove, a mark or a color mark.

8. The system according to claim 6, further comprising an inner volume between said pipe fitting and said connector body.

9. The system according to claim 1, further comprising a sensor capable of measuring flow or measuring temperature, light intensity, soil saturation, humidity, or wind intensity of an environment of the system.

10. The system according to claim 1, wherein at least one of said pipes comprises a water passage with a circular or elliptical wall and conductive wires placed in a protruding extension alongside the wall, said protruding extension comprising an interface breakable at a breaking point.

11. The system according to claim 1, further comprising a conductive pipe branch comprising a conductive pipe branch body connectable to an external surface of the pipe by melting or gluing.

12. A method comprising:

fluidly and electrically connecting pipes, each of which has a pipe passageway for fluid to pass therethrough and electrical conductors insulated from said pipe passageway, with at least one fluid connector which has a connector passageway for fluid to pass therethrough and electrical conductors insulated from said connector passageway, so that said pipes are fluidly and electrically connected to said at least one fluid connector;

using a fastener to tighten between the pipe and said at least one fluid connector and to achieve electrical connectivity between the electrical conductors of said at least one fluid connector and said pipe, wherein said fastener forces a portion of said electrical conductor of said at least one fluid connector through an insulating wall of said pipe until electrical connectivity is achieved with the electrical conductor of said pipe; and using a controller and a power source electrically connected to said pipes, wherein said controller comprise metal contacts in electrical contact with electrical transmission lines in said controller, said metal contacts being said portion of said electrical conductor which is forced through the insulating wall of said pipe.

13. The method according to claim 12, and electrically connecting an irrigation controller and a power source to said pipes.

* * * * *